US010257719B2

(12) United States Patent
Feng et al.

(10) Patent No.: US 10,257,719 B2
(45) Date of Patent: Apr. 9, 2019

(54) METHOD AND DEVICE FOR WIRELESS TOPOLOGY DISCOVERY FOR TRAIN BACKBONE NETWORKS

(71) Applicants: CRRC ZHUZHOU INSTITUTE CO., LTD., Zhuzhou, Hunan (CN); NEW JERSEY INSTITUTE OF TECHNOLOGY, Newark, NJ (US)

(72) Inventors: Jianghua Feng, Hunan (CN); Yu Liu, Newark, NJ (US); Osvaldo Simeone, Newark, NJ (US); Jun Tang, Hunan (CN); Zheng Wen, Hunan (CN); Alexander M. Haimovich, Newark, NJ (US); MengChu Zhou, Newark, NJ (US)

(73) Assignees: CRRC ZHUZHOU INSTITUTE CO., LTD., Zhuzhou (CN); NEW JERSEY INSTITUTE OF TECHNOLOGY, Newark, NJ (US)

( * ) Notice: Subject to any disclaimer, the term of this patent is extended or adjusted under 35 U.S.C. 154(b) by 77 days.

(21) Appl. No.: 15/299,623

(22) Filed: Oct. 21, 2016

(65) Prior Publication Data

US 2017/0251382 A1 Aug. 31, 2017

Related U.S. Application Data

(60) Provisional application No. 62/300,193, filed on Feb. 26, 2016.

(51) Int. Cl.
*H04W 24/02* (2009.01)
*H04W 8/00* (2009.01)
(Continued)

(52) U.S. Cl.
CPC .............. *H04W 24/02* (2013.01); *H04L 41/12* (2013.01); *H04L 43/16* (2013.01); *H04L 67/12* (2013.01);
(Continued)

(58) Field of Classification Search
CPC ........ H04L 67/12; H04L 41/12; H04W 24/02; H04W 72/0453; H04W 24/08; H04W 8/005
See application file for complete search history.

(56) References Cited

U.S. PATENT DOCUMENTS

2005/0259598 A1* 11/2005 Griffin .................... B61L 15/00
370/255
2006/0180709 A1* 8/2006 Breton ................ B61L 15/0036
246/1 C
(Continued)

*Primary Examiner* — Rina C Pancholi
(74) *Attorney, Agent, or Firm* — Nixon & Vanderhye P.C.

(57) ABSTRACT

Disclosed is a method for wireless typology discovery for train backbone networks. The method comprises steps of: receiving a data from a neighboring backbone node (BN), by a BN in a train backbone network through one directional antenna of at least one pair of directional antennas provided thereon; recording a receiving direction of said data, and determining said data to be a hello frame or a typology frame; performing neighbor discovery or topology discovery based on the type of said data; in neighbor discovery phase, performing a pair consistency check with respect to all the data received by the BN from a same direction, so as to identify a neighboring BN of the BN, and at the same time, stopping receiving hello frames from said direction by the BN; in typology discovery phase, updating a local typology table of the current BN based on the received typology frames; and performing a topology convergence check to see if any change occurs to the local typology table
(Continued)

of the current BN, and if no change occurs, reporting on the status of the typology discovery phase to an up-level application.

15 Claims, 14 Drawing Sheets

(51) Int. Cl.
| | |
|---|---|
| *H04L 29/08* | (2006.01) |
| *H04L 12/24* | (2006.01) |
| *H04L 29/06* | (2006.01) |
| *H04W 24/08* | (2009.01) |
| *H04L 29/14* | (2006.01) |
| *H04L 12/26* | (2006.01) |

(52) U.S. Cl.
CPC ............. *H04L 69/22* (2013.01); *H04L 69/40* (2013.01); *H04W 8/005* (2013.01); *H04W 24/08* (2013.01)

(56) References Cited

U.S. PATENT DOCUMENTS

| | | | | |
|---|---|---|---|---|
| 2006/0215624 | A1* | 9/2006 | Adya | H04W 8/005 370/338 |
| 2009/0219900 | A1* | 9/2009 | Kokkinen | B61L 15/0027 370/338 |
| 2014/0064140 | A1* | 3/2014 | Chhabra | H04W 48/20 370/254 |
| 2015/0131481 | A1* | 5/2015 | Lagrange | H04W 8/005 370/254 |
| 2016/0016596 | A1* | 1/2016 | Naylor | B61L 15/0027 709/220 |

* cited by examiner

METHOD AND DEVICE FOR WIRELESS TOPOLOGY DISCOVERY FOR TRAIN BACKBONE NETWORKS

This application and claims priority to U.S. Provisional Application No. 62/300,193 filed 26 Feb. 2016, the entire contents of which is hereby incorporated by reference.

TECHNICAL FIELD

The present disclosure relates to train communication technologies, and in particular, to a method and a device for wireless topology discovery for train backbone networks.

TECHNICAL BACKGROUND

The international standard IEC61375 divides a train communication network (TCN) into two hierarchical networks, namely a train backbone network at a higher level and consist networks (CNs) at a lower level. Currently, the train backbone network is mainly based on bus technology, and consists, for example, of wire train bus (WTB) and multifunction vehicle bus (MVB). WTB is primarily used in vehicles such as locomotives and EMU trains having requirements for dynamic car configuration, and MVB is primarily used in vehicles such as EMU trains with fixed car configuration.

The process for initiation and dynamic configuration of TCN is called train inauguration. The inauguration process is a precondition for normal operation of TCN and is performed when power supply or car configuration in a train changes. This process involves assignment of identifiers (IDs) to train backbone nodes (TBNs) and CNs, construction of physical topology for the network, determination of direction of cars with relation to a reference direction of the backbone network, and construction of logical topology for the network, etc.

Because a train backbone network consists of linear networks, completion of communications in such a network critically depends on topology discovery or train inauguration. Topology discovery or train inauguration is, however, achieved through learning and exchange of messages among BNs in the network. According to current standard for inauguration of wired train backbone networks, only neighboring BNs are connected via physical wires (as shown in FIG. 1). Therefore, train backbone communications can also be achieved by establishment of wireless communication link between two neighboring BNs belonging to different CNs (as shown in FIG. 2). Compared with wired communications, wireless communications are more flexible and convenient, and can solve problems such as difficulty of wire connections between consist networks in a wired backbone network, lack of wiring space, complexity in operation and maintenance, and so on. However, the implementation of topology discovery over a wireless network is made difficult by the broadcast nature of the wireless medium, and by fading and interference.

To summarize, the implementation of topology discovery over a wired network is capable of realizing train inauguration, but is restricted in its application by electrical connections between cars, high wiring cost, difficulty in detecting of a line fault and in maintaining of lines, limited wiring space for which it has to contend with power lines, and by the need to manually cut off or reconnect the cables between different consist networks for car reconfiguration, which is complex to operate and time-consuming, and may result in wrong and unstable cable connection. Besides, connectors used become easily aged and may also cause faults in the lines.

Backbone communications based on a wireless network can avoid all the above problems. However, the implementation of wireless topology discovery is made difficult by the broadcast nature of the wireless medium, and by fading and interference.

It is therefore desirable to provide a method and a system for simple and effective topology discovery for a wireless train backbone network, for example, in the process of train inauguration.

SUMMARY OF THE INVENTION

The objective of the present disclosure is to address the technical problem of the incapability of the existing technologies in providing simple and effective topology discovery for a wireless train backbone network.

In order to achieve the above objective, the present disclosure provides a method for wireless topology discovery for train backbone networks. The method comprises steps of: receiving, by a BN in a train backbone network, data from a neighbor of the BN, through one directional antenna of at least one pair of directional antennas provided thereon; recording a receiving direction of said data, and determining said data to be a hello frame or a topology frame; performing neighbor discovery or topology discovery based on the type of said data; performing, in neighbor discovery phase, a pair consistency check on the data received by the BN along a same direction, so as to identify a neighbor of the BN, and at the same time, stopping receiving hello frames along said direction, updating, in topology discovery phase, a local topology table of the current BN based on the received topology frames; and performing a topology convergence check to determine whether any change occurs to the local topology table of the current BN during a period of time, and reporting the status of the topology discovery phase to a high-level application if no change occurs.

According to one embodiment of the present disclosure, the frequency at receiving channel of each BN is different from that at transmission channel, and each antenna of the directional antenna pair has a different frequency band.

According to another embodiment of the present disclosure, in the neighbor discovery phase, a neighbor discovery counter is provided for counting hello frames received from a same BN, and the BN is identified as a neighbor of the current BN if the neighbor discovery counter reaches or exceeds a first pre-defined threshold value.

According to another embodiment of the present disclosure, after identifying the neighbor of the current BN, topology frames along said direction from the neighbor are received, and wherein if the destination address of the received topology frames is the address of the current BN, a pair consistency check on said currently received topology frames and previously saved topology frames is performed so as to determine whether the current BN and the neighbor are pairwise consistent or not, and in the meantime, receiving any hello frames along said direction from the neighbor is stopped.

According to another embodiment of the present disclosure, after identifying the neighbor of the current BN, it starts to receive topology frames along said direction from the neighbor node, and wherein if the destination address of the received topology frames is not an address of the current BN and the neighbor discovery counter exceeds a predefined threshold value, a notice of a neighbor discovery failure is issued.

According to another embodiment of the present disclosure, a topology convergency check on local topology frames received by the current BN is performed, and wherein if any change occurs to the local topology frames, the current BN fails the topology convergency check, and then updating the local topology table based on changed topology frames and initializing the topology counter to zero; and if no change occurs to the local topology frames, the topology counter is increased by one, and if the topology counter reaches or exceeds a pre-defined threshold, the topology convergency check is passed and topology discovery at the current BN is completed.

According to another embodiment of the present disclosure, the topology frame contains a list of ordered MAC addresses in a current topology table of a sender BN.

According to another embodiment of the present disclosure, a topology frame sent by a BN to a right neighbor contains all the currently known MAC address of BNs on the left of the BN in the discovered physical order, and a topology frame sent by the BN to a left neighbor contains all the currently known MAC address of BNs on the right of the BN in the discovered physical order.

According to another aspect of the present disclosure, a device for wireless topology discovery for train backbone networks is provided.

The device comprises: a receiving unit, for receiving, by a backbone node in a train backbone network data from a neighbor BN of the backbone node, through one directional antenna of at least one pair of directional antennas provided thereon, a recording unit, for recording a receiving direction of said data, and determining said data to be a hello frame or a topology frame, a neighbor discovery unit, for performing neighbor discovery or topology discovery based on the type of said data, and in neighbor discovery phase, performing a pair consistency check on the data received by the BN along a same direction, so as to identify a neighbor of the BN, and at the same time, stopping receiving hello frames along said direction by the BN, a topology discovery unit, for updating a local topology table of the current BN based on the received topology frames in topology discovery phase, and a topology generation unit, for performing a topology convergence check to determine whether any change occurs to the local topology table of the current BN during a period of time, and, reporting the status of the topology discovery phase to a high-level application if no changes occurs.

According to one embodiment of the present disclosure, the frequency at receiving channel of each BN is different from that at transmission channel, and each antenna of the directional antenna pair has different frequency band.

According to another embodiment of the present disclosure, in the neighbor discovery phase, a neighbor discovery counter is used for counting hello frames received from a same BN, and the BN is identified as a neighbor of the current BN if the neighbor discovery counter reaches or exceeds a first pre-defined threshold value.

According to another embodiment of the present disclosure, after identifying the neighbor of the current BN, the current BN starts to receive topology frames sent along said direction from the neighbor, and wherein if the destination address of the received topology frames is the address of the current BN, a pair consistency check on said currently received topology frames and previously saved topology frames is performed so as to determine whether the current BN and the neighbor are pairwise consistent or not, and in the meantime, the current BN stops receiving any hello frames along said direction from the neighbor.

According to another embodiment of the present disclosure, after identifying the neighbor of the current BN, the BN starts to receive topology frames along said direction from the neighbor node, and wherein if the destination address of the received topology frames is not an address of the current BN and the neighbor discovery counter exceeds a pre-defined threshold value, a notice of a neighbor discovery failure is issued.

According to another embodiment of the present disclosure, a topology convergency check is performed with respect to local topology frames received by the current BN. If any change occurs to the local topology frames, it signals that the current BN fails the topology convergency check, and then the local topology table is updated based on changed topology frames and a topology counter is initialized to zero; and if no change occurs to the local topology frames, the topology counter is increased by one, and if the topology counter reaches or exceeds a pre-defined threshold, it signals that the topology convergency check is passed and topology discovery at the current BN is completed.

According to another embodiment of the present disclosure, the topology frame contains a list of ordered MAC addresses in a current topology table of a sender BN.

According to another embodiment of the present disclosure, a topology frame sent by a BN to a right neighbor contains all the currently known MAC address of BNs on the left of the BN in the discovered physical order, and a topology frame sent by the BN to a left neighbor contains all the currently known MAC address of BNs on the right of the BN in the discovered physical order.

Other features and advantages of the present disclosure will be further explained in the following description, and will partly become self-evident therefrom, or be understood through the implementation of the present disclosure. The objectives and advantages of the present disclosure will be achieved through the structures specifically pointed out in the description, claims, and the accompanying drawings.

BRIEF DESCRIPTION OF THE DRAWINGS

The accompanying drawings, together with the embodiments, are provided for a further understanding of the present disclosure, and constitute a part of the description, and are not intended to limit the present disclosure.

DETAILED DESCRIPTION OF THE EMBODIMENTS

The present disclosure will be explained in detail below with reference to the accompanying drawings, so that the objective, technical solutions and advantages thereof can be understood more clearly.

The basic task of topology discovery is to enable each BN to learn the physical topology of a train backbone network. The physical topology consists of an ordered list of media access control (MAC) addresses of the BNs in the network, where the order reflects the physical location of the BNs in the linear topology. According to current standard IEC61375-2-5, the process operates via the exchange of MAC-level messages among the BNs in a distributive fashion. To illustrate the concept of a physical topology, an example is provided in FIG. 1 for a train backbone network. In this example, the physical topology lists the MAC addresses of the BNs in the order from 1 to 6. A starting point of the ordering of the BNs in the physical topology is fixed at the time of deployment.

The topology discovery protocol (TDP) that is currently being standardized for train backbone communications applies to wired train backbone networks, in which the BNs are connected to their neighbors via dedicated wires. The TDP usually consists of two phases, namely neighbor discovery and topology discovery.

In the neighbor discovery phase, each BN finds the MAC address of its neighboring BNs. In the topology discovery phase, the physical topology is detected via message exchange at the MAC layer. The standard also considers the discovery of the "logical" topology of the train. To implement TDP, the BNs transmit two types of MAC frames: hello frames, which carry only the MAC address of the sender BN and are used for neighbor discovery; and topology frames which carry information about the MAC addresses of the BNs currently "discovered" by the sender BN and are used for topology discovery.

Figure 1:
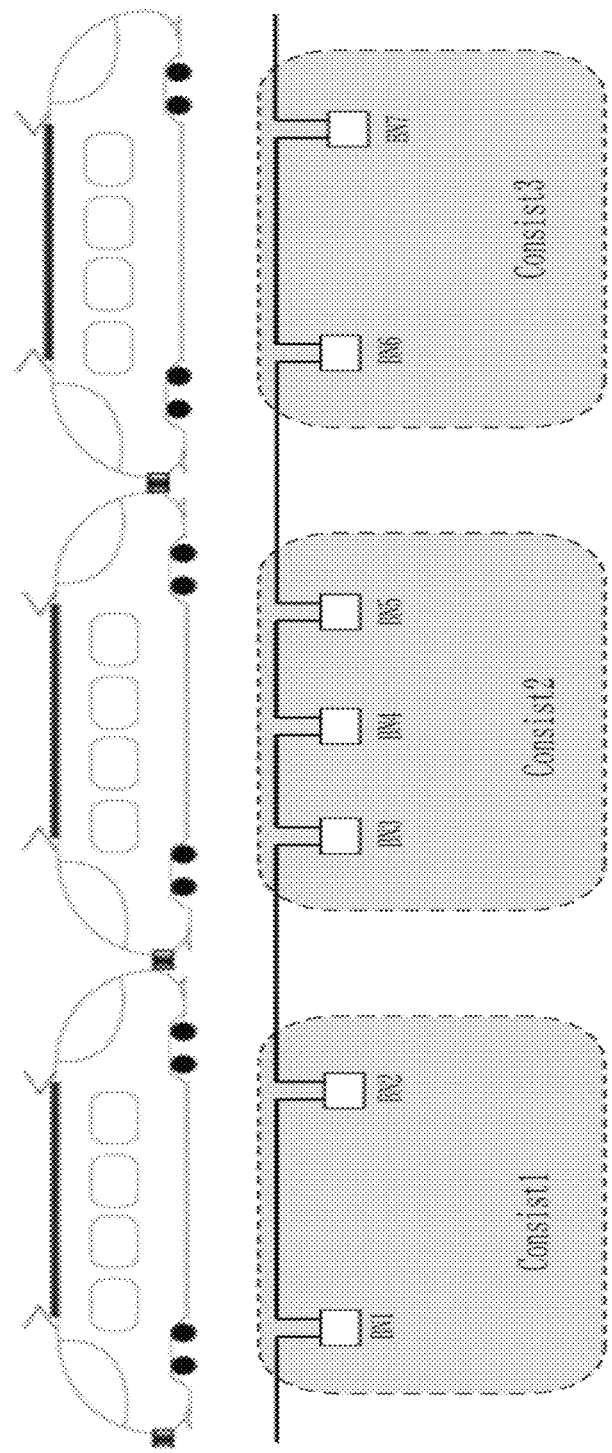
FIG. 1 shows the topological structure of a wired train backbone network according to the existing technologies.

While the standard IEC61375-2-5 applies to wired backbone networks, there is high interest in the industry to develop a fully wireless solution. The implementation of TDP over a wireless network is made difficult by the broadcast nature of the wireless medium, and by fading and interference. Consider for instance the neighbor discovery phase. In wired TDP, hello frames are transmitted only to the neighbor(s) of a BN as shown in FIG. 1. The neighbor discovery phase hence only requires that a single hello frame be received correctly from each neighbor. Wireless broadcasting instead, causes a frame to be received also by BNs that are not physical neighbors, making the detection of physical neighbors challenging.

Figure 2:
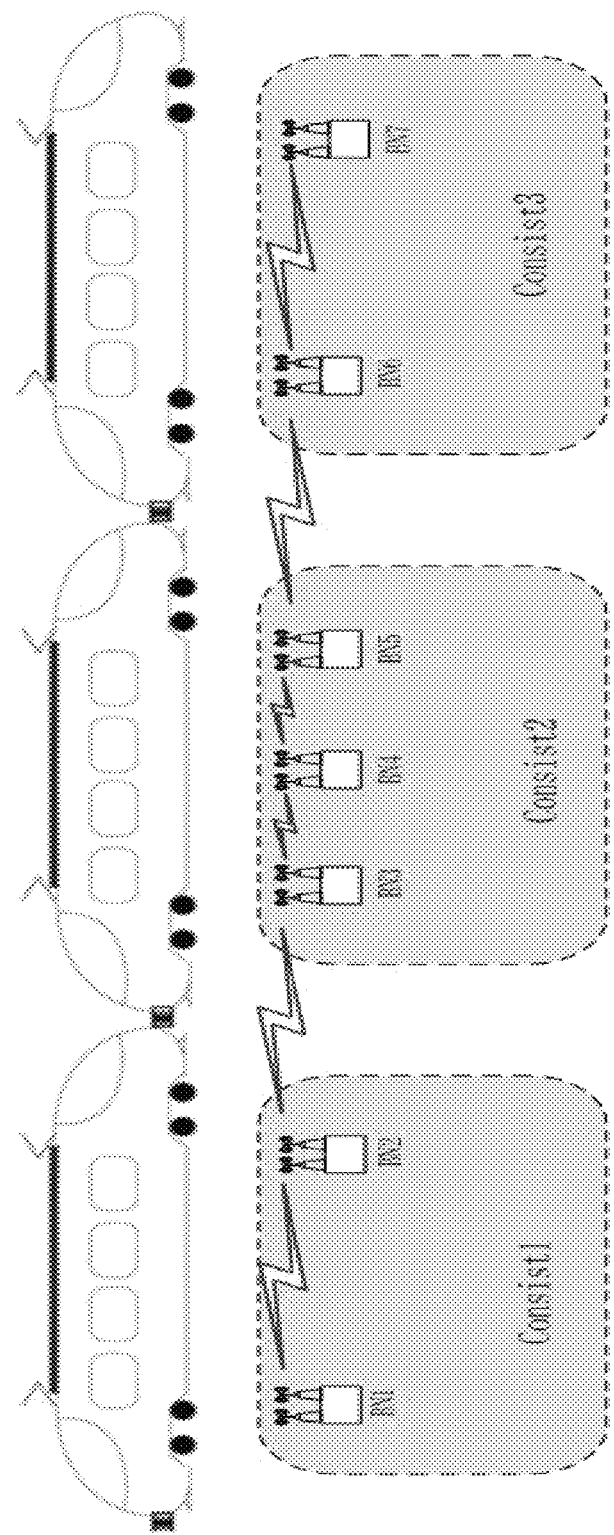
FIG. 2 shows the topological structure of a wireless train backbone network according to the present disclosure.

This effect is compounded by the fact that, due to fading and interference, there is a non-zero probability that decoding errors impair the transmission from physical neighbors more significantly than the transmission from further BNs. Unlike the wired case, simultaneous transmissions in the same frequency band may lead to interference, which may cause the loss of a packet. For instance, with reference to FIG. 2, it is possible for BN 4 to decode the hello frame sent by BN 2 correctly, while decoding the hello frame from BN 3 incorrectly due to fading or interference. Another issue is that the standard IEC61375-2-5 prescribes the multicasting of a topology frame to all the BNs in the network. In a wireless implementation, this is bound to create large backlogs and excessive interference. To address these challenges, the present disclosure provides a wireless topology discovery protocol (WTDP).

In studies on wireless network topology discovery, the key underlying assumption is that two BNs are considered to be neighbors if they are within their respective transmission ranges such that it is possible to establish a direct link between them. The topology discovery protocol hence aims at identifying connectivity, or reachability, properties of the network. This is typically done either by checking if a hello message is successfully received or by measuring received signal strengths. The design of specific topology discovery algorithms has been conducted in the context of different protocols such as IEEE802.11, or ZigBee. However, train backbone networks have their own features, and hence design of topology discovery algorithms for them is unique, too.

In classical topology discovery, as discussed above, a BN is considered to be a neighbor as long as it is reached with a significantly large power. This goal is completely different from the requirements of train backbone inauguration, in which instead a neighbor is defined by its physical location and not by the strength of the received power. To see the difference, note that each BN has only two neighbors, one that should be specified as left-neighbor and one as right-neighbor. In contrast, a classical topology discovery scheme may identify an arbitrary number of neighbors that happen to receive the transmitted signal with sufficient power without consideration of their physical location.

Figure 3:
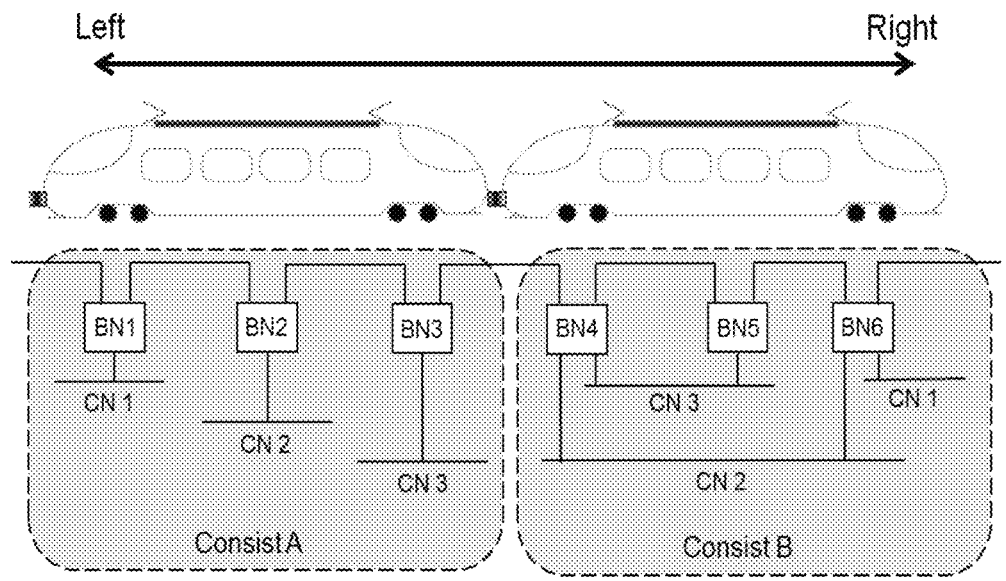
FIG. 3 shows the topological structure of a train backbone network with consist networks connected to BNs thereof according to the present disclosure.

The following is a brief review about the standard wired TDP. Before the inauguration process, each BN knows its own MAC address and also the unique identifier (ID) of the consist networks (CNs) that are connected to the BN. A CN represents a subnetwork on the train. BNs may belong to multiple CNs, as illustrated in FIG. 1. The goal of TDP is to enable all the BNs to learn the physical and logical topologies of the train. As mentioned above, the physical topology consists of an ordered list of BNs. The logical topology refers to an ordered list of CNs, with indication for each CN of the participant BNs, where the order reflects the physical location of the CNs. For instance, the logical topology for the network in FIG. 3 lists the CN IDs in the order A.1, A.2, A.3, B.3, B.2 and B.1, along with the corresponding MAC address of the BNs, as shown in Table. I.

TABLE I

Physical and Logical Topologies

| CN ID | MAC address of BN | BN ID | subnet ID |
|---|---|---|---|
| A.1 | BN 1's MAC address | 1 | 1 |
| A.2 | BN 2's MAC address | 2 | 2 |
| A.3 | BN 3's MAC address | 3 | 3 |
| B.3 | BN 4's MAC address | 4 | 4 |
| B.3 | BN 5's MAC address | 5 | 4 |
| B.2 | BN 4's MAC address | 4 | 5 |
| B.2 | BN 6's MAC address | 6 | 5 |
| B.1 | BN 6's MAC address | 6 | 6 |

After inauguration, a BN ID is assigned to each BN according to the identified physical topology, and a subnet ID is assigned to each CN following the logical topology that is discovered. Taking the backbone network in FIG. 3 as an example, all six BNs are assigned with BN IDs in the ascending order from the left end to the right end, as illustrated in Table I. In the same order, the subnet IDs are assigned according to the logical topology (see standard IEC61375-2-5 for further details).

Each BN, except the two at the beginning and end of the train, has two outgoing links, one toward its neighbor to the "right" and one towards the "left". Note that the notions of "left" and "right" are common to all BNs on the backbone and are set by construction. Similarly, each BN has also two incoming links, one from the neighbor on the left and one from the neighbor on the right.

Neighbor discovery is achieved as follows. Each BN sends a hello frame to its neighboring BNs in the network via the MAC layer. When another BN receives the hello frame, it learns the MAC address of the sending neighbor, and identifies the sending neighbor as a right-neighbor or a left-neighbor by the incoming link thereof through which the hello frame is received. When the BN receives both the hello frames from the right neighbor and the left neighbor, the neighbor discovery phase is completed (An end BN can learn that a BN is not provided on its right side or on its left side).

After neighbor discovery, topology discovery is performed. Each BN sends a topology frame carrying topology information (see Table I) to its neighboring BNs. All the BNs and CNs has a unique ID. Each BN maintains a physical and topology table and updates its physical and logical topology table upon reception of a topology frame, and transmits information about the updated topology table via a topology frame. Topology discovery is completed when the topology information of each BN no longer changes.

Figure 4:
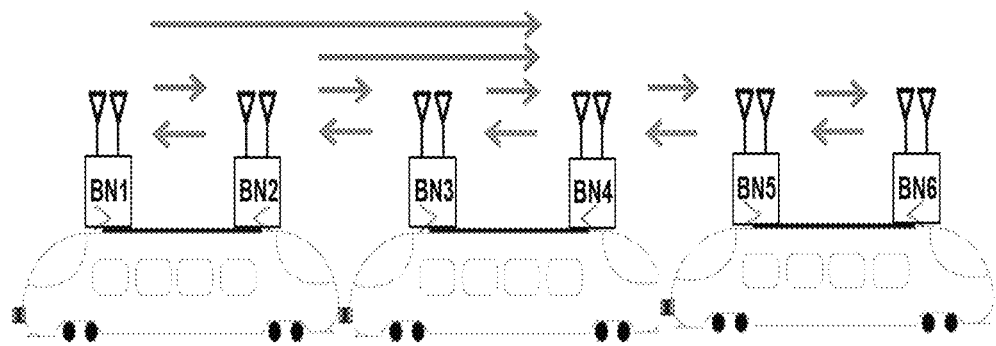
FIG. 4 schematically shows the situation in which BNs are provided with directional antennas according to the present disclosure.
Figure 5:
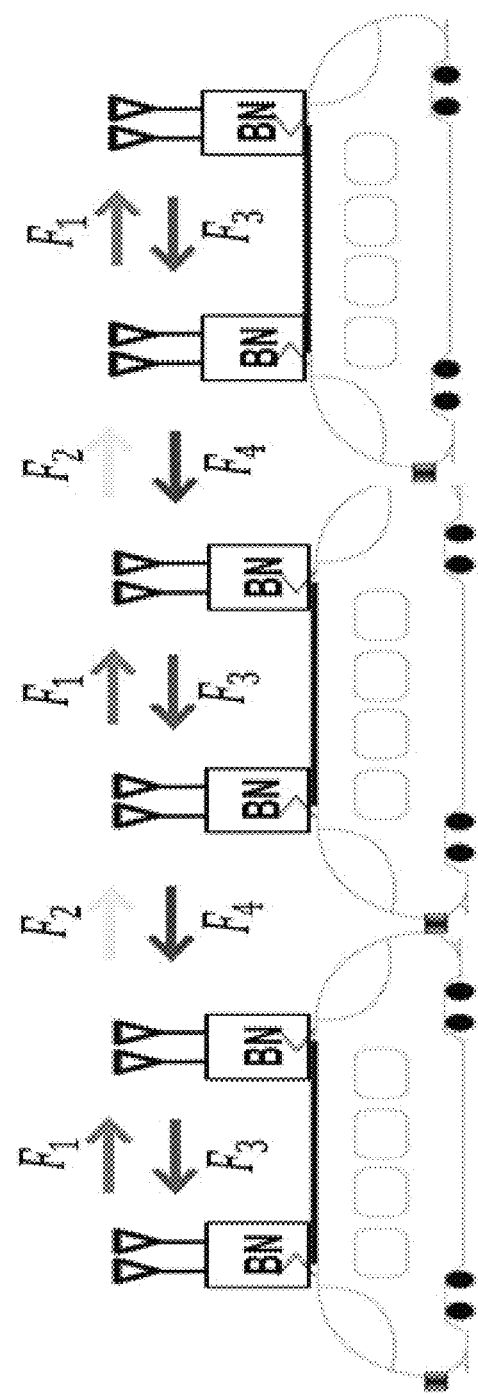
FIG. 5 schematically shows the situation in which a BN operates on two different pairs of frequencies for reception and transmission according to the present disclosure.

To prevent effect on the wireless communication caused by frequency interference, each BN operates on a pair of two different frequencies in each direction, one for transmission and the other for reception, and operates on two different pairs of frequencies in both directions. As shown in FIGS. 4 and 5, BN2 receives on F1 and transmits on F3 in the left direction, and receives on F4 and transmits on F2 in the right direction. This can effectively alleviate frequency interference. Besides, with the increase of the number of usable frequency pairs, communication distance between non-neighboring BNs becomes larger, which can reduce the danger of receiving a hello frame from a non-neighboring BN.

All the BNs have two directional antennas and share the notion of a "left" and a "right" direction, so that the BNs can distinguish between the signals received from the right and left directions, thus providing a physical basis for the BN's identification for right and left neighbors in neighbor discovery. In addition, the use of directional antenna can define the direction and scope of wireless signal coverage. This can reduce interference on a target train by a neighboring train on a parallel track, thus avoiding topology discovery failure caused by an error of identifying a BN in the neighboring train as a neighboring BN in the target train.

To summarize, in order to ensure accuracy of topology discovery, the following conditions must be satisfied before the topology discovery algorithm provided by the present disclosure is performed. Each BN should be assigned with a unique MAC address. A right end BN and a left end BN should be specified. A wireless network should be configured to make wireless communications possible. Wireless communication protocol is not restricted in present disclosure, and it can be ZigBee, WiFi, etc.

In addition, the algorithm provided by the present disclosure makes use of communications at the MAC layer, and determines a source BN and a destination BN through the MAC address of the BN.

Figure 6:
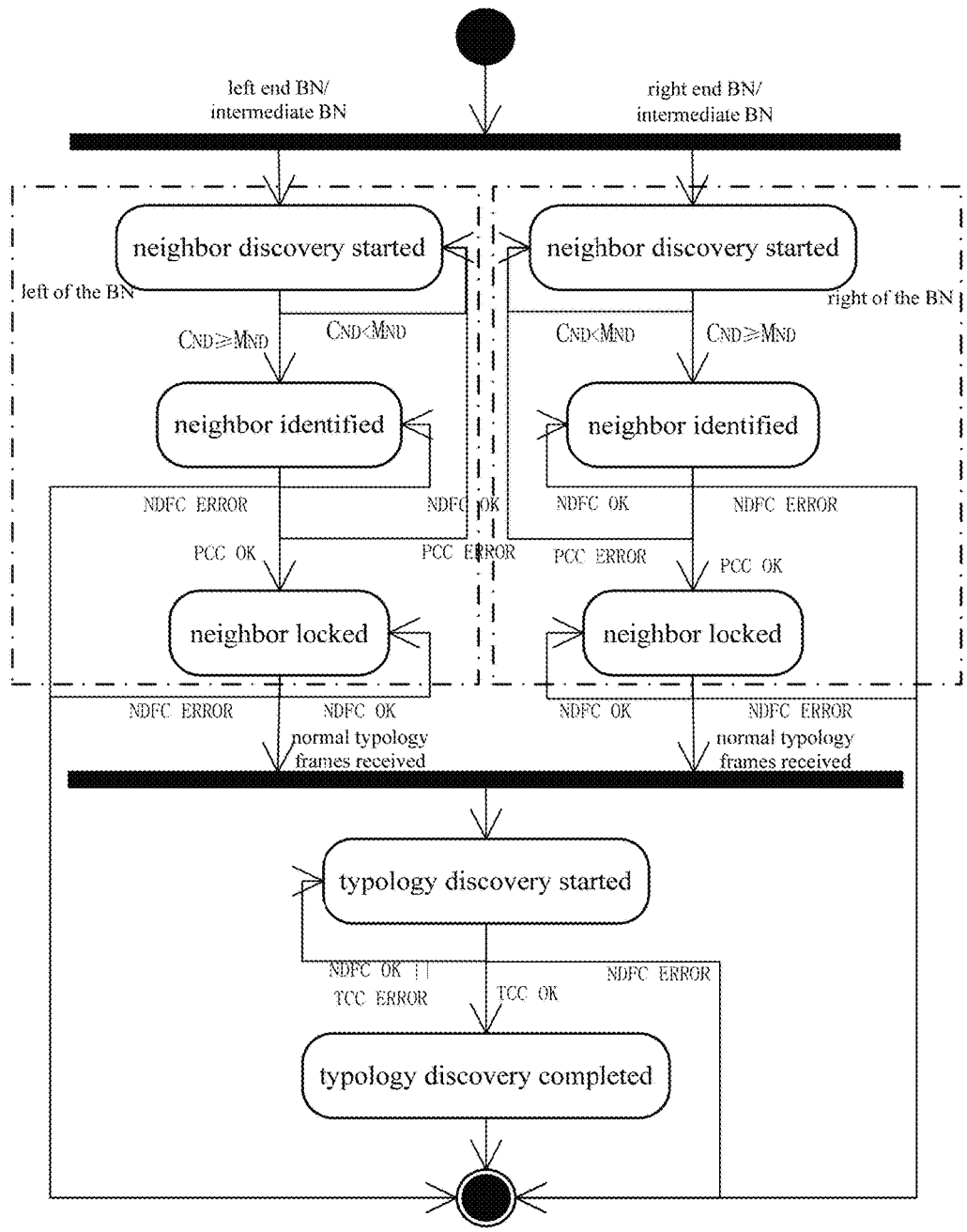
FIG. 6 is a general flow chart of the topology discovery by a BN according to the present disclosure.

FIG. 6 shows a BN through five different phases, i.e., neighbor discovery, pairwise consistency check (PCC), neighbor discovery failure check, topology discovery, and topology convergency check. Operations of neighbor discovery, pairwise consistency check, and neighbor discovery failure check on the right side and on left side of an intermediate BN are performed independently, but are done to update a same topology table to complete the topology discovery. An end BN, however, performs topology discovery only in one direction, and does not operate in the other direction. In other words, a right end BN performs topology discovery only on its left side, and a left end BN performs topology discovery only on its right side. The five phases are performed specifically as follows.

Neighbor Discovery:

As discussed above, neighbor discovery in a wireless train backbone is significantly more complex than in the wired counterpart system. This is due to the broadcast properties of the wireless channel, which cause the hello frame transmitted by a BN to be received not only by the actual neighbor BN but generally also by further away BNs. As a result, unlike in the wired system, reception of the hello frame does not, per se, establish that the sender BN is a neighbor.

In order to achieve neighbor discovery, the proposed scheme leverages the fact that, on the average, the power received from an actual neighboring BN is larger than that received from any other BN. This is due to the lower path loss between closer BNs. Therefore, for instance, it is more likely that a hello frame is received correctly from an actual neighbor than from farther BNs. It is critical to note, however, that, due to fading, it cannot be excluded that a hello frame from a non-neighboring BN is received successfully, while that of the actual neighbor is not.

For each hello frame correctly decoded in either direction, if the MAC of the sender BN is already in the list of neighbor discovery (ND) counters, then the corresponding counter is increased by one; else, a new counter is created, initialized to zero and associated to the MAC address at hand. A BN is identified to be a neighbor if it is the first whose ND counter reaches a pre-defined threshold $M_H$. In this event, this BN is defined as the identified neighbor of the receiving BN. The described operations are within in the "neighbor discovery" block of FIG. 6.

Specifically, in the process of neighbor discovery, a BN transmits a same hello frame to the right and left directions, and at the same time receives hello frames from BNs on its right and left. Taking a BN named BNi for instance, when BNi receives a hello frame from BNj on its left, if this is the first time that BNi receives a hello frame from BNj, then an ND counter corresponding to BNj is created, and is initialized to zero (NDC(j)=O); if BNi has received a hello frame from BNj, then the ND counter corresponding to BNj is increased by one. In this case, if NDC(j)≥MND (MND represents a pre-defined threshold), BNj will be defined as the left-neighbor of BNi. After that, BNi starts pair consistency check (PCC) in the left direction. If topology frames from other BNs are received during neighbor discovery phase, said topology frames are saved.

The algorithm proposed above makes exclusive use of information available at the MAC layer. This choice has been made in order to allow for a simpler implementation, and is in line with the wired counterpart standard.

Pair Consistency Check (PCC):

If a BN starts PCC in a certain direction, it stops receiving hello frames coming from said direction, but still sends hello frames periodically. In the meanwhile, the BN starts to send a topology frame to the identified neighbor in said direction, receives topology frames transmitted from said direction, and performs PCC and neighbor discovery failure check (NDFC) with respect to topology frames received from said direction and previously saved topology frames.

If a BN receives topology frames addressed to a BN other than itself, neighbor discovery failure check (NDFC) is performed. If the number of topology frames addressed to other BNs reaches a pre-defined threshold $M_{NDF}$, it indicates failure of NDFC and incorrect neighbor discovery, and an error is reported for further processing.

In order to reduce the probability of incorrect neighbor discovery, the present disclosure proposes to perform a pairwise consistency check (PCC) upon the reception of a topology frame. The key observation is that the topology frame is addressed to the currently identified neighbor. Note that the hello frames in the present disclosure are instead broadcast. Therefore, based on the reception of topology frames, each BN can verify whether the neighbor discovery is pairwise consistent with respect to its neighbor in either direction. Pairwise consistency means that two BNs consider each other as neighbors, one on the left and the other on the right. If a topology frame is received from a BN that is not considered as a neighbor, then the receiving BN can conclude that neighbor discovery is not pairwise consistent in the direction of the received packet.

To be specific, if the topology frame is received from a currently identified neighbor, this identified neighbor passes the PCC and is upgraded to the status of locked neighbor. Once a locked neighbor is established for a BN, any received topology frame from other BNs is discarded. Instead, if a BN receives a topology frame from a BN different from the identified neighbor, its identified neighbor fails the PCC and all ND counters are reinitialized to zero in order to restart the neighbor discovery phase for the receiving BN. Note that, if a topology frame is received before any identified neighbor is established, the frame is saved for a PCC later. The detailed procedure for PCC is described within the "pairwise consistency check" block of FIG. 6.

As shown in FIG. 6, if a BN receives a topology frame addressed to itself, it performs PCC. If said topology frame is received from a neighboring BN that is the identified neighboring BN, it indicates that the identified neighbor passes PCC, and then the BN starts neighbor discovery failure check (NDFC) in the corresponding direction; otherwise, the identified neighbor fails the PCC and all ND counters in said direction are initialized to zero in order to restart the neighbor discovery phase for the receiving BN.

Neighbor Discovery Failure Check (NDFC):

PCC helps improve the accuracy of neighbor discovery, but it does not rectify errors that occur when two neighboring BNs identify their neighbors incorrectly. This type of failure is defined as neighbor identification failure. An example is shown in FIG. 6. It is seen that, if BN 3 identifies BN 5 as a neighbor and BN 4 identifies BN 2 as a neighbor, this error cannot be corrected by PCC because neither BN 3 nor BN 4 will send a topology frame to the other.

In order to identify the neighbor discovery failure described above, the present disclosure proposes to perform neighbor discovery failure check. The idea is that, after a neighbor has been identified but not locked, if a BN receives too many topology frames addressed to a BN other than itself, it is probable that its actual neighbor had identified some other BN as its neighbor. In this case, this BN cannot successfully complete neighbor discovery and a red flag is raised. Specifically, each BN maintains an NDF counter, which counts the number of topology frames addressed to other BNs that are received after a neighbor has been identified. When the NDF counter reaches a pre-defined threshold $M_{NDF}$, the BN raises a red flag warning the train operator of a neighbor discovery failure.

Figure 7A:
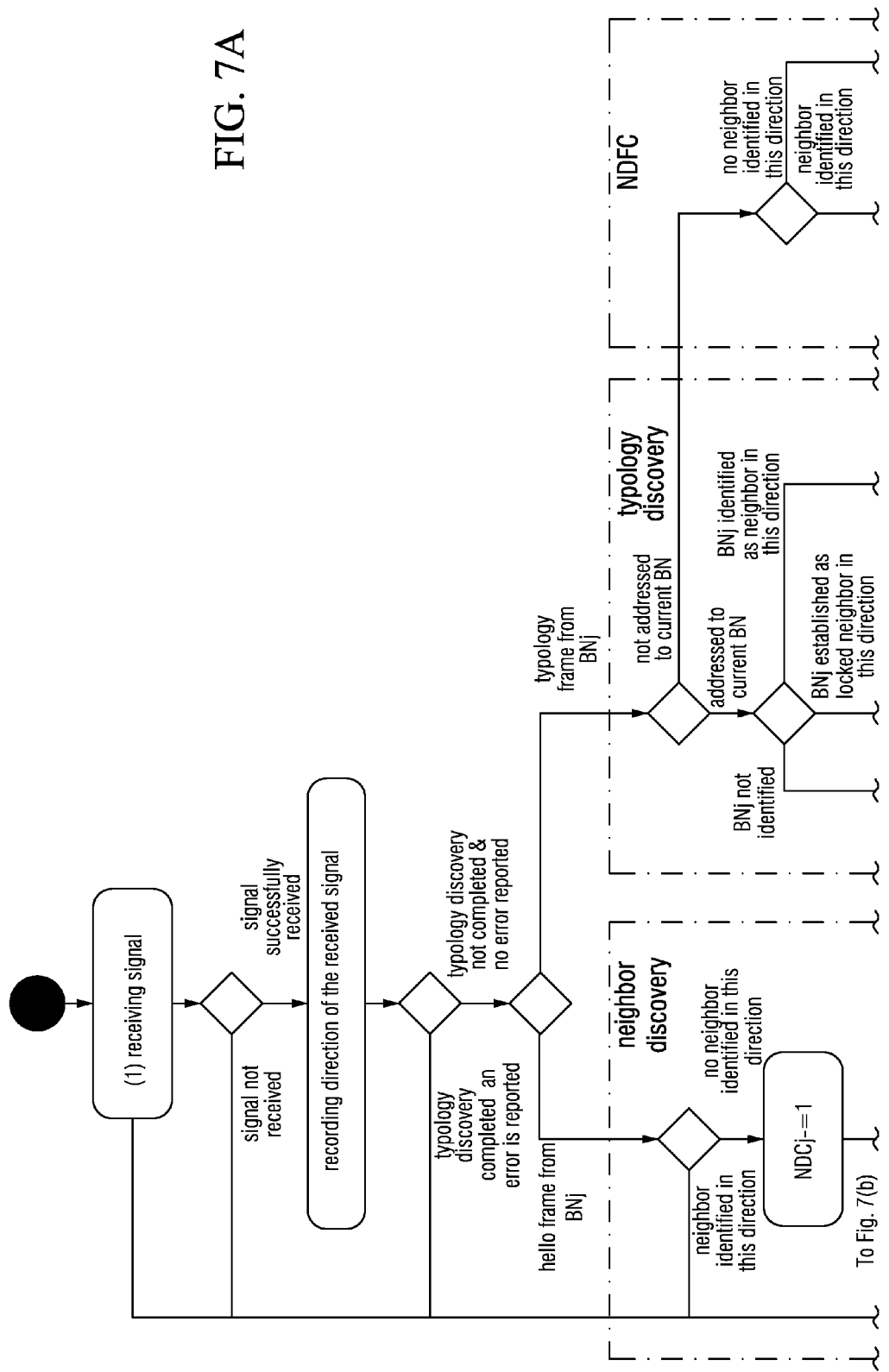
FIG. 7A is a detailed flow chart of the topology discovery by a BN according to the present disclosure.
Figure 7B:
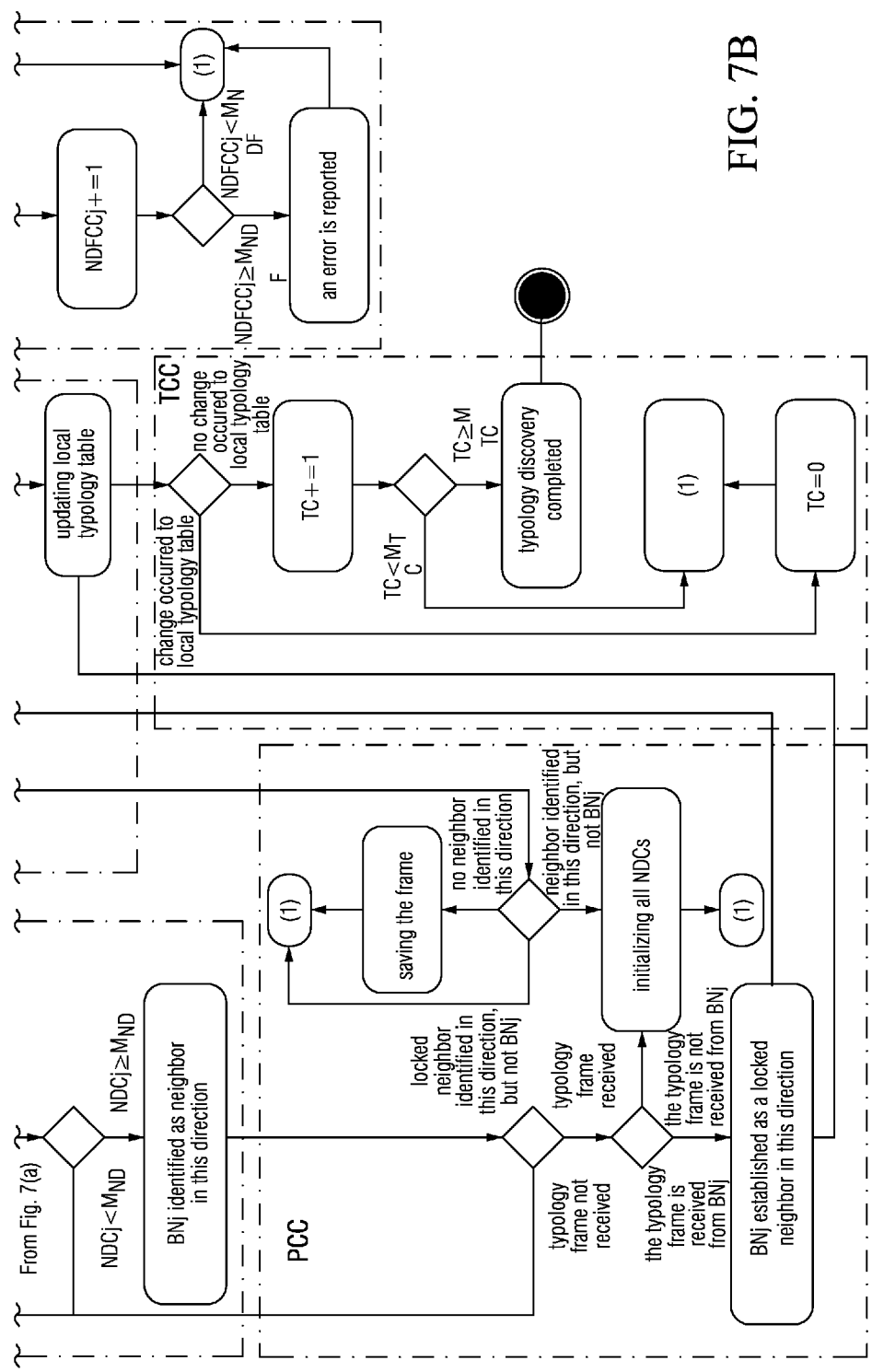
FIG. 7B is a continuation of detailed flow chart of the topology discovery by a BN according to the present disclosure.
Figure 8:
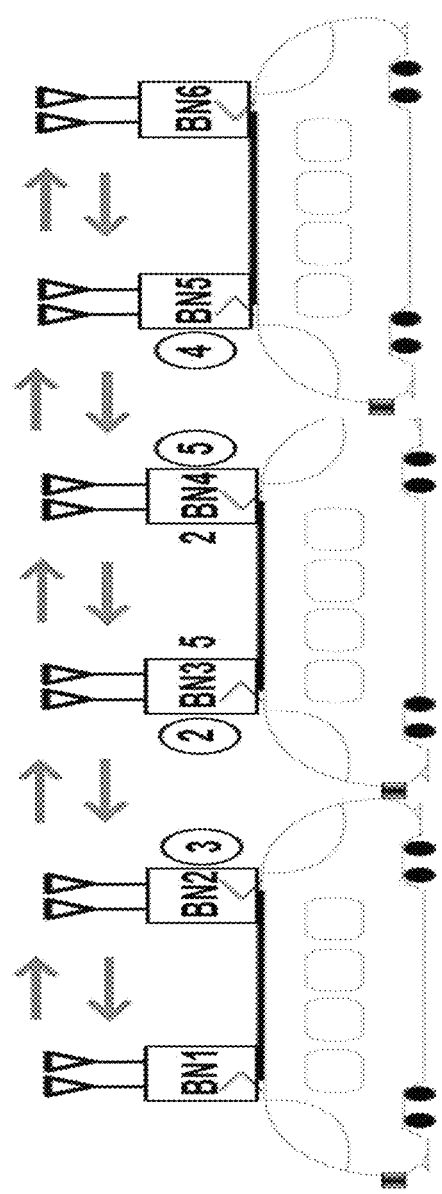
FIG. 8 schematically shows BNs receiving and transmitting on two frequency pairs according to one embodiment of the present disclosure.
Figure 9:
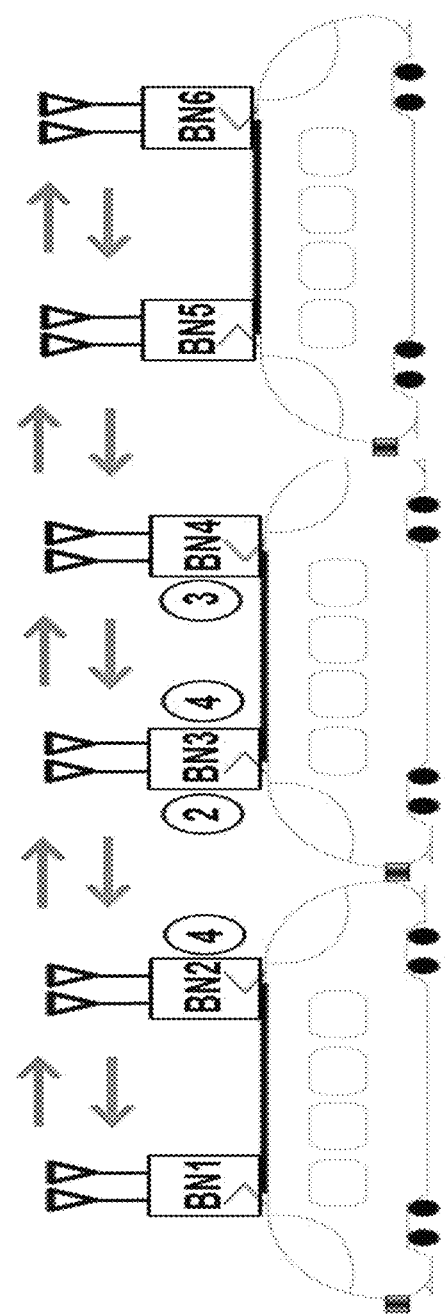
FIG. 9 schematically shows BNs receiving and transmitting on two frequency pairs according to another embodiment of the present disclosure.
Figure 10:
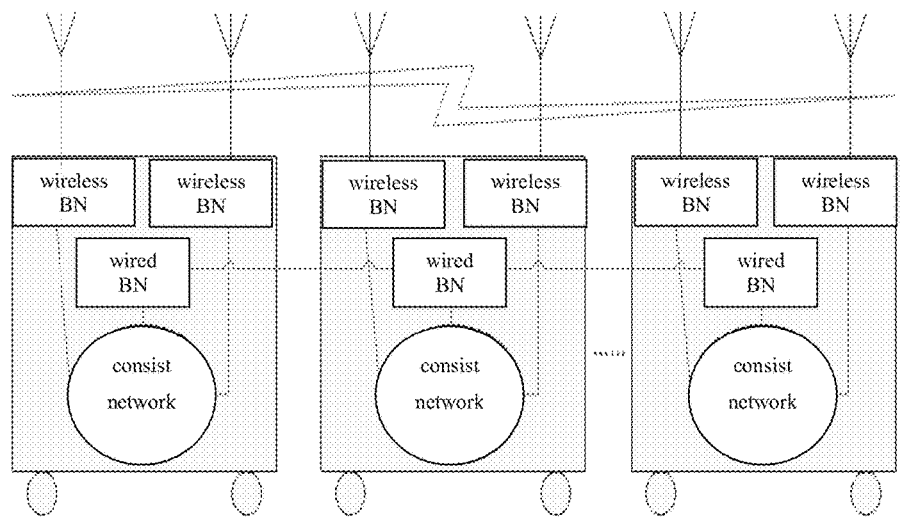
FIG. 10 schematically shows the topological structure of a network consisting of a combination of wireless backbone networks, wired backbone networks, and consist networks according to the present disclosure.

The other possible neighbor discovery failure happens when a BN is established as the locked neighbors by more than one BN. This causes the problem that certain BNs do not receive topology frame from their locked neighbors and thus topology discovery will never be completed. This type of failure is defined as neighbor locking failure. An example is shown in FIG. 7, where although BN 2 established BN 4 as its locked neighbor, BN 4 has locked with BN 3, and hence no topology frames will be received by BN 2 from BN 4. To deal with this problem, after the neighbor of a BN is locked, the NDF counter is initialized and used to count topology frames received from BNs different from its locked neighbor. A red flag is raised if the NDF counter exceeds the threshold.

Due to the introduction of the PCC phase and NDFC phase, the protocol proposed in the present disclosure is a bidirectional protocol. Hence, these phases can also be used to counteract hello flooding attacks based on wormhole (tunneling), or compromised nodes. In a hello flooding attack, hello messages/frames are transmitted or tunneled with a very abnormal high power convincing many surrounding nodes that the malicious node is their neighbor.

Specifically, in one embodiment, when a BN starts NDFC, if it receives a topology frame addressed to a BN other than itself, it performs NDFC with respect to said received topology frame. If NDFC is passed, it indicates a success of topology discovery; otherwise, it indicates a failure of topology discovery, and an error is reported for further processing. If the BN receives a topology frame addressed to itself, it starts topology discovery.

Topology Discovery:

As described above, multicasting a topology frame is impractical in WTDP. To solve this issue, the present disclosure proposes that, in WTDP, the topology frame contains an ordered, rather than an unordered as in wired TDP, list of MAC addresses in the current topology table of the sender BN. Specifically, the topology frame sent to the neighbor on the right contains all the currently known MAC address of the BNs on the left of the BN in the discovered physical order, and vice versa for the topology frame sent to the neighbor on the left. The topology frame also includes the CN IDs that are connected to, rather than only the sender BN as in wired TDP, all BNs currently discovered. Taking the wireless backbone network in FIG. 4 as an example, if the associated logical topology is identical to that shown in FIG. 2, and if BN 4 has identified BN 3 as a neighbor and has discovered that BNs 5 and 6 are on its right, the topology frame sent by BN 4 to BN 3 contains an ordered list of MAC addresses of BNs 5 and 6. It also includes the IDs of the CNs that are connected to the BNs 4, 5 and 6, namely, CN B.3 and CN B.2 are connected to BN 4; CN B.3 is connected to BN 5; CN B.2 and CN B.1 are connected to BN 6. A topology frame is sent to an identified or locked neighbor. Based on a received topology frame, the receiving BN updates its local topology table only if the received topology frame is from its locked neighbor. Note that after the physical topology is learned, the logical topology can be learned in the same way as in the wired TDP.

After a successful neighbor discovery has been resolved for all BNs, it is necessary and sufficient to have a "right-ward" and a "left-ward" pass in order to complete topology discovery. For instance, in FIG. 4, assume that the protocol starts from BN 1, which sends a topology frame to its neighbor on the right BN 2, which in turn sends a topology frame to its neighbor BN 3, and so on until BN 6. At the end of this right-ward pass, it is easy to see that each BN in FIG. 4 learns the backbone topology on its right. A similar left-ward pass completes the topology discovery at each BN. It can also be seen that the mentioned frames are also necessary in order to learn the train topology.

The WTDP proposed by the present disclosure differs from the standard wired TDP in that the latter prescribes multicasting of topology frames and the inclusion of an unordered list of discovered BNs and the CN IDs that are connected to the sender BN only in the topology frames.

In topology discovery phase, if the BN receives a topology frame addressed to a BN other than itself, it performs NDFC with respect to said received topology frame. If NDFC is not passed, it indicates a failure of topology discovery, and an error is reported for further processing. If the BN receives a topology frame addressed to itself, it updates its topology table based on the received topology frames, and starts topology convergency check (TCC) phase.

Topology Convergency Check (TCC):

In order for the operator to make a decision about the completion of the inauguration process, the BNs must report on the status of their topology discovery phase. To this end, each BN runs a topology convergence check as shown in the "topology convergency check" block of FIG. 6. Accordingly, when a topology frame is received from a locked neighbor, if any change needs to be made to the local topology table, the topology counter for the BN is initialized; otherwise, the counter is increased by one. The topology discovery completion for a BN is claimed if the topology counter reaches a pre-defined threshold $M_T$. In other words, the topology discovery is considered to be complete by a BN if no change is made to its topology frame across $M_T$ successively received topology frames from the locked neighbor. The completion of topology discovery is indicated by green flags raised by the BNs.

To be specific, in one embodiment, in the TCC phase, TCC is performed with respect to the local topology frames. If any change occurs to any of the local topology frames, TCC is not passed, and the local topology table is updated based on the local topology frames and the topology counter is initialized to zero; otherwise, the topology counter is increased by one. If the topology counter reaches a pre-defined threshold $M_{TC}$, the topology discovery completion for the BN is claimed, and the BN completes topology discovery. After completion of the topology discovery, the BN still has to send topology frames to other BNs periodically to ensure completion of topology discovery by other BNs. The BN, in the meanwhile, reports on the status of its topology discovery phase to an up-level application.

The data structure in the present disclosure can be normalized as required. An example is provided herein for a better understanding. According to one embodiment of the present disclosure, a hello frame can be described as shown in Table II.

TABLE II

| Serial No. | Shift | Meaning | Size (byte) |
|---|---|---|---|
| 1 | 0 | Source MAC address | 6 |
| 2 | 6 | reservation | 2 |
| 3 | 8 | reservation | 2 |
| 4 | 10 | CRC code | 2 |

A topology frame can be described as shown in Table III.

TABLE III

| Serial No. | Shift | Meaning | Size (byte) |
|---|---|---|---|
| 1 | 0 | Destination MAC address | 6 |
| 2 | 6 | Source MAC address | 6 |
| 3 | 12 | Typology discovery state<br>−1: error<br>0: initialized<br>1: neighbor discovery<br>2: pairwise consistency check (PCC)<br>3: neighbor discovery failure check (NDFC)<br>4: typology discovery<br>5: topology convergency check | 1 |
| 4 | 13 | Number of discovered BNs | 1 |
| 5 | 14 | reservation | 2 |
| 6 | 16 | Serial No. of BN1 | 1 |
| 7 | 17 | reservation | 1 |
| 8 | 18 | MAC address of BN1 | 6 |
| 9 | 24 | Configuration information of BN1, including information of subnet, devices | 64 |
| 9 | 88 | Serial No. of BN2 | 1 |
| 10 | 89 | reservation | 1 |
| 11 | 90 | MAC address of BN2 | 6 |
| 12 | 96 | Configuration information of BN2, including information of subnet, devices | 64 |
| ... | ... | ... | ... |

Wireless Topology Discovery Protocol (WTDP) Proposed by the Present Disclosure WTDP is based on a physical implementation of the system that leverages directional antennas and frequency planning.

Directional Antenna:

All the BNs have two directional antennas and share the notion of a "left" and a "right" direction. Each BN hence can transmit and receive on both its right-pointing and left-pointing antennas. Note that the assumption concerning the common notion of the left and right directions is consistent with the model considered in the wired standard. Directional antennas enable a BN to distinguish between the signals received from the left and right directions.

Frequency Planning:

To cope with interference, two sets of frequencies are used, one for the right-pointing antennas and one for the left-pointing antennas. Each directional antenna operates on two different frequencies, one for transmission and one for reception. Moreover, the same frequency is reused every F hops. Therefore, if F=1, full frequency reuse in each direction occurs; instead, if F>1, there are F-1 BNs transmitting in the same direction but using different frequencies between two transmitters using the same frequency. FIG. 5 is referred to for an illustration. Note that, with a frequency reuse 1/F, the closest non-neighboring BN that may receive a hello frame is F-1 hops away. A more conservative frequency reuse hence reduces the danger of receiving a hello frame from a non-neighboring BN. A smaller frequency reuse also reduces the effect of interference.

Performance Analysis of the Proposed WTDP

In order to get some insights into the performance of the proposed WTDP, the implementation of WTDP with a slotted ALOHA MAC protocol is considered. Note that the protocol does not depend on the adoption of a specific MAC layer protocol and that slotted ALOHA is assumed here to enable analysis. According to slotted ALOHA, time is slotted, a transmitted frame takes one slot, and each BN transmits a frame in a slot with probability p. Specifically, at each time slot, a BN transmits a hello frame with probability $p_H$, and transmits a topology frame with probability $p_T$.

Hence, the transmission probability p is the sum of $p_H$ and $p_T$, i.e., $p=p_H+p_T$. Flat Rayleigh fading channels are assumed such that the instantaneous channel gain between two BNs k hops away can be written as $SNR_0|h|^2/(1+(k-1)F)^\eta$, where the average signal to noise ratio (SNR) for two BNs one hop away is defined as $SNR_0$, $|h|^2$ is exponentially distributed with mean one, and $\eta$ denotes the path loss exponent. Furthermore, the channels across different time slots are assumed to be independent, while the channel is a constant within the period of a frame transmission. It is noted that a more general channel model, such as Rician or Nakagami fading, could also be accommodated in the analysis but at the cost of a more cumbersome notation due to the lack of some closed-form expressions that are available for Rayleigh fading as discussed below. Experiments with Rician fading will be presented later.

In the following, an analysis is provided for the neighbor discovery phase in terms of the probability of correct neighbor discovery and of the average time required to complete neighbor discovery. There two conflicting criteria will also be combined to yield the average time needed to achieve successful neighbor discovery. The goal of the analysis is to obtain insights into the selection of the critical threshold parameter $M_H$. The performance of the overall WTDP will be evaluated in the next section via numerical results.

A. Neighbor Discovery for a Single BN

In this subsection, the neighbor discovery for a single receiving BN on any given side is considered. The probability $Q_{C,ND}$ of correct neighbor discovery and the cumulative distribution function (CDF) $F_{T_{ND}}(t)$ of the time $T_{ND}$ that it takes to complete neighbor discovery are computed. To elaborate, assume that the furthest BN from which hello frames can be received is K hops away. The signal-to-interference-and-noise ratio (SINR) for the signal transmitted by a BN k hops away is given by $$SINR_k = \frac{|h_k|^2 \frac{SNR_0}{(1+(k-1)F)^\eta}}{1 + \sum_{k' \neq k}^{K} i_{k'} |h_{k'}|^2 \frac{SNR_0}{(1+(k'-1)F)^\eta}}, \quad (1)$$

where $i_{k'}=1$ if the BN k' hops away is transmitting and $i_{k'}=0$ otherwise. Moreover, the instantaneous channel capacity for the link between the two BNs, which are k hops away from each other, is given by [34]

$$C_k = \log(1+SINR_k). \quad (2)$$

Whenever the transmission rate R [bits/sec/Hz] is not larger than the instantaneous capacity $C_k$, the packet transmitted by the BN k hops away is correctly received, and an outage is declared otherwise [35].

Define the vector $i=[i_1, \ldots, i_K]^T$ that defines the set of currently transmitting BNs. At any time slot, the probability of a successful frame reception from a BN k hops away conditioned on i can be expressed as $$Q_S(k|i) = i_k \frac{p_H}{p} Pr[C_k \geq R | i]. \quad (3)$$

Substituting (2) into (3) leads to $$Q_S(k|i) = i_k \frac{p_H}{p} \quad (4)$$

$$Pr\left[\frac{|h_k|^2 SNR_0}{(1+(k-1)F)^\eta} \geq 2^R - 1 + \sum_{k' \neq k}^{K} i_{k'}(2^R-1)\frac{|h_{k'}|^2 SNR_0}{(1+(k'-1)F)^\eta}\right].$$

Using the result in [36] leads to $$Q_S(k|i) = i_k \frac{p_H}{p} \exp\left(-\frac{2^R-1}{SNR_0}(1+(k-1)F)^\eta\right) \times \quad (5)$$

$$\prod_{k' \neq k}^{K} \left[1 + i_{k'}(2^R-1)\frac{(1+(k-1)F)^\eta}{(1+(k'-1)F)^\eta}\right]^{-1}$$

Averaging over all possible transmission states i, the probability of a successful frame transmission from a BN k hops away can be written as $$Q_S(k) = \sum_{i \in I} P_i(i) Q_S(k|i), \quad (6)$$

where I denotes the set that contains all possible $2^K$ transmission state vectors and $P_i(i)$ is the probability mass function of vector i.

Due to the independence of the fading channels across the time slots, the time $T_K$ that it takes to receive $M_H$ hello frames from a BN k hops away is distributed as $T_k \sim NB(M_H, Q_S(k))$, where the notation NB(M,p) is used to denote a negative binomial distribution (in a sequence of independent Bernoulli (p) trials, let the random variable N denote the trial at which the Mth success occurs, where M is a fixed integer. Then N has a negative binomial distribution [37] with parameter (M, p), i.e. N~NB(M,p)) with parameter (M,p). Accordingly, the probability mass function of $T_K$ is given by [37]

$$P_{T_k}(t) = \binom{t-1}{M_H - 1} Q_S(k)^{M_H} (1 - Q_S(k))^{t-M_H}, \quad (7)$$

for $t \geq M_H$; and the complementary cumulative distribution function (CCDF) of $T_K$, which for $t \geq M_H$; and the complementary cumulative distribution function (CCDF) of $T_K$, which equals to the probability that hello frames sent by a BN k hops away are received successfully $M_H$ times after the tth time slot, can be expressed as [37]

$$\bar{F}_{T_k}(t) = 1 - I_{Q_S(k)}(M_H, t - M_H + 1), \text{for } t \geq M_H. \quad (8)$$

where $1_x(z,w)$ denotes the regularized incomplete beta function with parameters (x, z, w).

So far, the distribution of the time needed to receive $M_H$ hello frames from a given transmitting BN has been considered. Now interest is given in deriving the probability $Q_{C,ND}$ of correct neighbor discovery. This calculation is complicated by the fact that the receptions of frames from different BNs are correlated with each other due to the mutual interference among BNs. To address this issue, an approximation is made here that the decoding outcomes for the packets sent by different BNs are independent. The validity of this approximation will be evaluated in later section by numerical results. Recall that, if the first BN from which hello frames are received successfully $M_H$ times is the BN one hop away, neighbor discovery is correct. Hence, using the said independence assumption, the probability of correct neighbor discovery for a single receiving BN is $$Q_{C,ND} = \sum_{t \geq M_H}^{\infty} \left[ P_{T_1}(t) \prod_{k \geq 2}^{K} \bar{F}_{T_k}(t) \right]. \quad (9)$$

Finally, regardless of whether it is correct or not, neighbor discovery is considered to be complete when a BN decodes $M_H$ hello frames successfully from at least one of other transmitting BNs. The CDF of the time it takes to complete neighbor discovery for the BN $T_{ND}$ can be expressed, under the independence assumption, as $$F_{T_{ND}}(t) = 1 - Pr[T_{ND} > t] \quad (10)$$
$$= 1 - Pr[\min\{T_1, T_2 \ldots, T_K\} > t]$$
$$= 1 - \prod_{k=1}^{K} \bar{F}_{T_k}(t).$$

B. Neighbor Discovery Across the Entire Network

In this subsection, the performance metrics of neighbor discovery across the entire network is derived. Specifically, the probability $Q^*_{C,ND}$ of correct neighbor discovery, the average time $E[T^*_{ND}]$ required to complete neighbor discovery for all BNs and the average time $E[T^*_{ND,suc}]$ needed to achieve a successful neighbor discovery are derived.

Because the neighbor discovery outcomes for different BNs are not independent, the analytical derivation of statistical quantities associated with neighbor discovery performance is challenging. For this reason, the approximation mentioned above will be made that the neighbor discovery outcomes for different BNs are independent. With this approximation, probability of correct left and right neighbor discovery for all BNs in the network can be expressed as $$Q_{C,ND}^* = (Q_{C,ND})^{2D}, \quad (11)$$

where D denotes the total number of receiving BNs and the factor 2 stems from the fact that different frequencies are used for transmission and reception and hence, the left neighbor discovery is independent from the right neighbor discovery. Similarly, the CDF of the time it takes to achieve a successful neighbor discovery on both left and right sides is given by $$F_{T_{ND,L}}^*(t) = (F_{T_{ND,L}}(t))^{2D}. \quad (12)$$

The average time needed to achieve a successful neighbor discovery $E[T^*_{ND}]$ is then given by $$E[T^*_{ND}] = \sum_{t=0}^{\infty} \left[ 1 - F_{T^*_{ND}}(t) \right]. \quad (13)$$

Next, the two statistical quantities $Q^*_{C,ND}$ and $E[T^*_{ND}]$ are combined to yield the average time it takes to achieve a successful neighbor discovery $E[T^*_{ND,suc}]$. Using Wald's equality [38] (If $\{X_n; n \geq 1\}$ is a sequence of independent identically distributed random variables with mean $\bar{X}$ and if the mean E[J] of the stopping time J satisfies E[J]<∞, then the sum $S_J = X_1 + X_2 + \ldots + X_J$ at the stopping time J satisfies Wald's equality $E[S_J] = \bar{X} E[J]$.), this can be evaluated as the ratio $$E[T^*_{ND,suc}] = \frac{E[T^*_{ND}]}{Q^*_{C,ND}}. \quad (14)$$

Trains on Parallel Tracks

Figure 11:
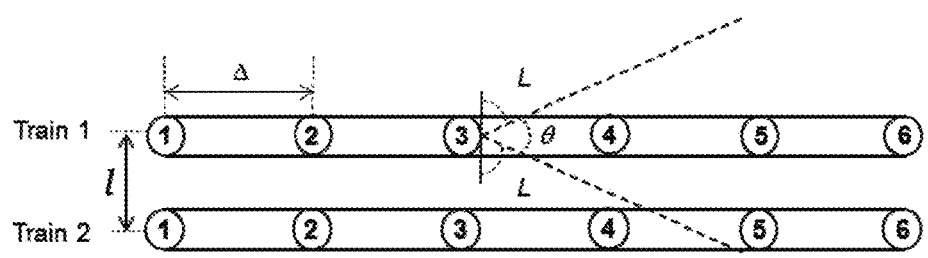
FIG. 11 shows signal loss of two trains located on parallel tracks performing separate inauguration processes.

In this section, a scenario of practical interest is provided. In this scenario, two trains located on parallel tracks perform separate inauguration processes. As shown in FIG. 11, it is assumed that the number of BNs for each train is the same, and the distance between a BN and its neighbor on the same train is denoted as Δ, while l denotes the distance between two trains. It is also assumed that BNs are aligned as in FIG. 11. Let the directional antenna of each BN have a mainbeam of width θ, while sidelobes have an L dB loss compared to the mainlobe. For instance, in FIG. 11, BN 3 and BN 4 on train 2 are in the side lobe region of the right-pointing antenna of BN 3 on train 1, and hence are received by BN 3 on train 1 with a loss of L dB. Instead, no loss occurs for the reception by BN 3 on train 1 of the signals sent by BN 5 and BN 6 on train 2 or BNs 4-6 on train 1.

The following section deals with the evaluation of the performance of the proposed WTDP as applied to a wireless network that runs the ALOHA MAC protocol. Unless stated otherwise, the following conditions are assumed: i) a flat Rayleigh fading channels; ii) a path loss exponent η=3.5; iii) an average SNR of 15 dB for two BNs one hop away, i.e., $SNR_0$=15 dB; iv) a total of six BNs in the network; v) at any time slot, a hello frame is transmitted with probability, $p_H$=0.15, and a topology frame is transmitted with probability, $p_H$=0.15; vi) a data rate R 1.5 [bits/sec/Hz] for the hello frames, and vii) full frequency reuse is adopted, i.e., F=1. A more conservative frequency reuse would alleviate interference and therefore improve the performance.

A. Effects of the Threshold $M_H$

Figure 12:
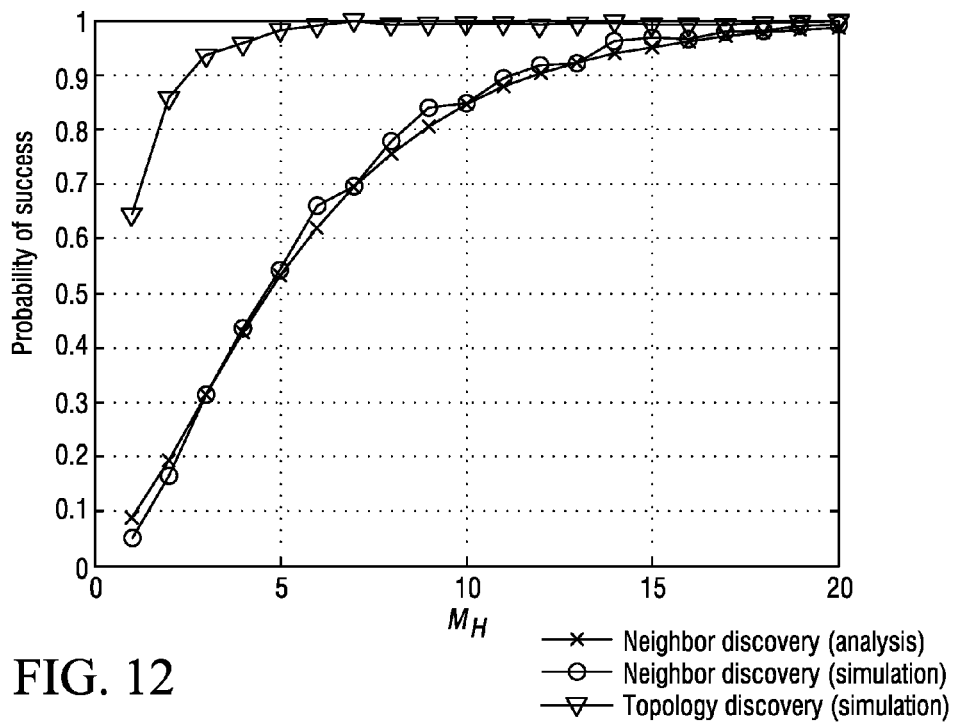
FIG. 12 shows effects of threshold parameter $M_H$ on neighbor discovery performance throughout the train inauguration process performed according to the embodiments of the present disclosure.
Figure 13:
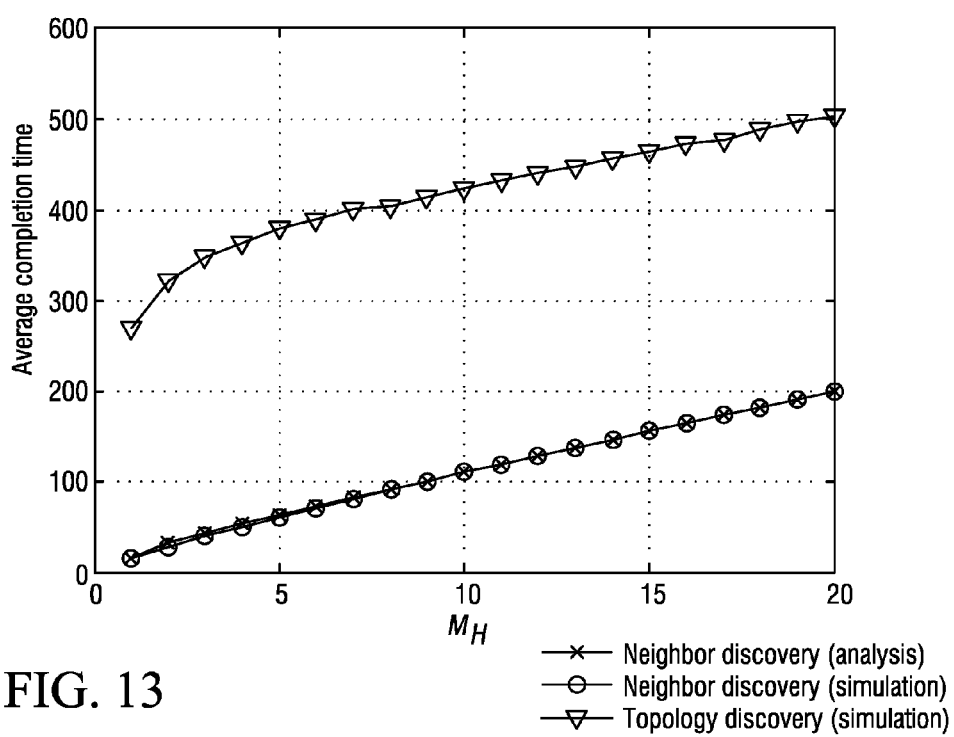
FIG. 13 shows effects of threshold parameter $M_H$ on neighbor discovery performance throughout the train inauguration process performed according to the embodiments of the present disclosure.
Figure 14:
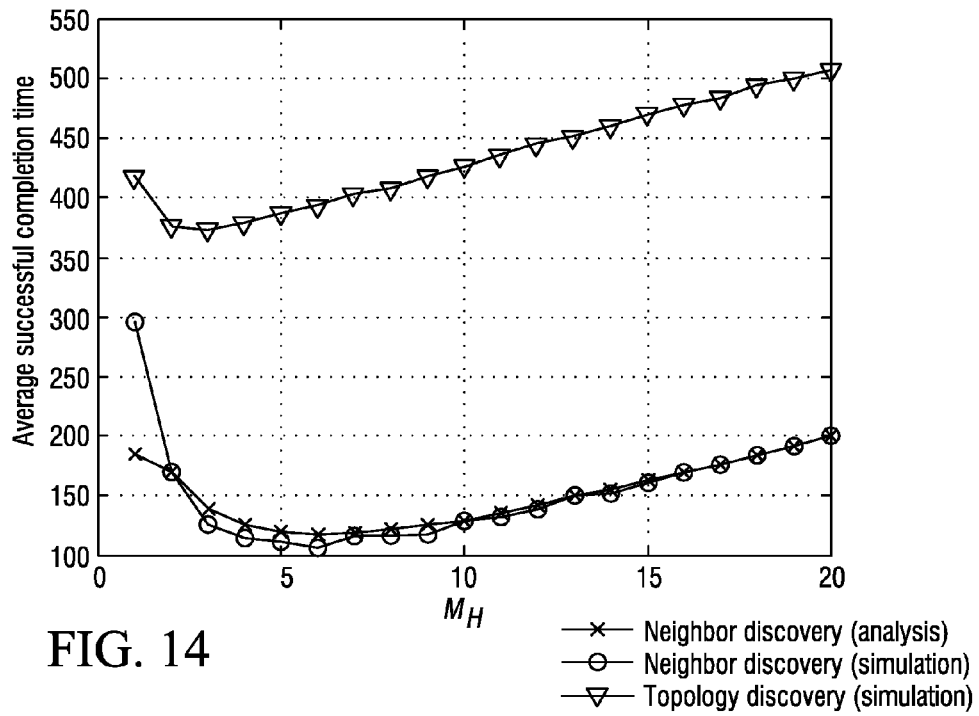
FIG. 14 shows effects of threshold parameter $M_H$ on neighbor discovery performance throughout the train inauguration process performed according to the embodiments of the present disclosure.

The effect of the threshold parameter $M_H$ on the neighbor discovery performance is first investigated. In FIGS. 12-14, the probability of correct neighbor discovery, the average time required to complete neighbor discovery and the average time needed to achieve a successful neighbor discovery are shown as a function of $M_H$, respectively. Both the analytical results (11), (13) and (14) and the performance obtained via Monte Carlo simulations are plotted. It can be seen from FIGS. 12-14, that the analysis predicts the performance of neighbor discovery well in terms of the three criteria. As expected, the success rate and time needed to complete neighbor discovery increase as threshold $M_H$ increases. This leads to a trade-off in the selection of $M_H$: a larger $M_H$ improves the probability of successful neighbor discovery but, at the same time, it increases the time needed for neighbor discovery. This trade-off is illustrated in FIG. 14, which demonstrates that there exists a value of $M_H$ that minimizes the time needed to achieve successful neighbor discovery. It is observed that the analysis allows to correctly predict the optimal value of $M_H$.

FIGS. 12-14 also present the performance for the overall proposed inauguration process including all the phases described in the former section. To this end, $M_{NDF}$ and $M_T$ are set to $M_{NDF}$=20 and $M_T$=30, and the performance via Monte Carlo simulations is evaluated. The dramatic success rate improvement for the inauguration over neighbor discovery is to be ascribed to the PCC. This improvement can be also seen to decrease the optimal value of $M_H$. It can also be observed that there is a difference of about 300 time slots between the time required to complete neighbor discovery and the time required to complete the whole inauguration process. This is due to the fact that besides neighbor discovery, the inauguration process needs to complete also topology discovery.

B. Effects of the Threshold $M_{NDF}$ and $M_T$

Figure 15:
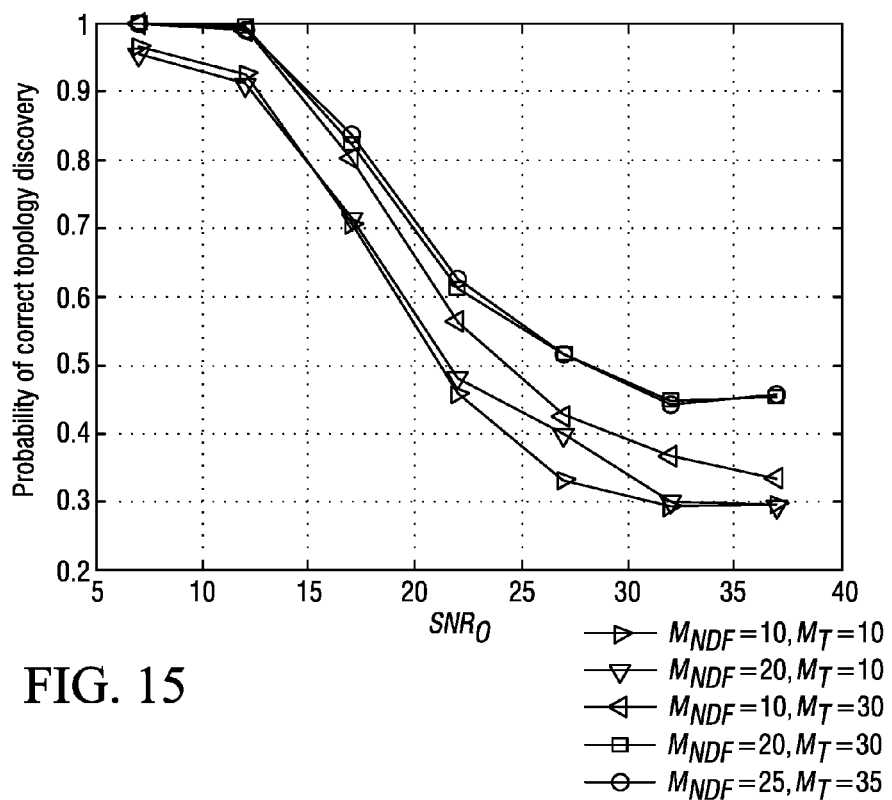
FIG. 15 shows the probability of correct neighbor discovery by adopting a certain threshold according to the present disclosure.
Figure 16:
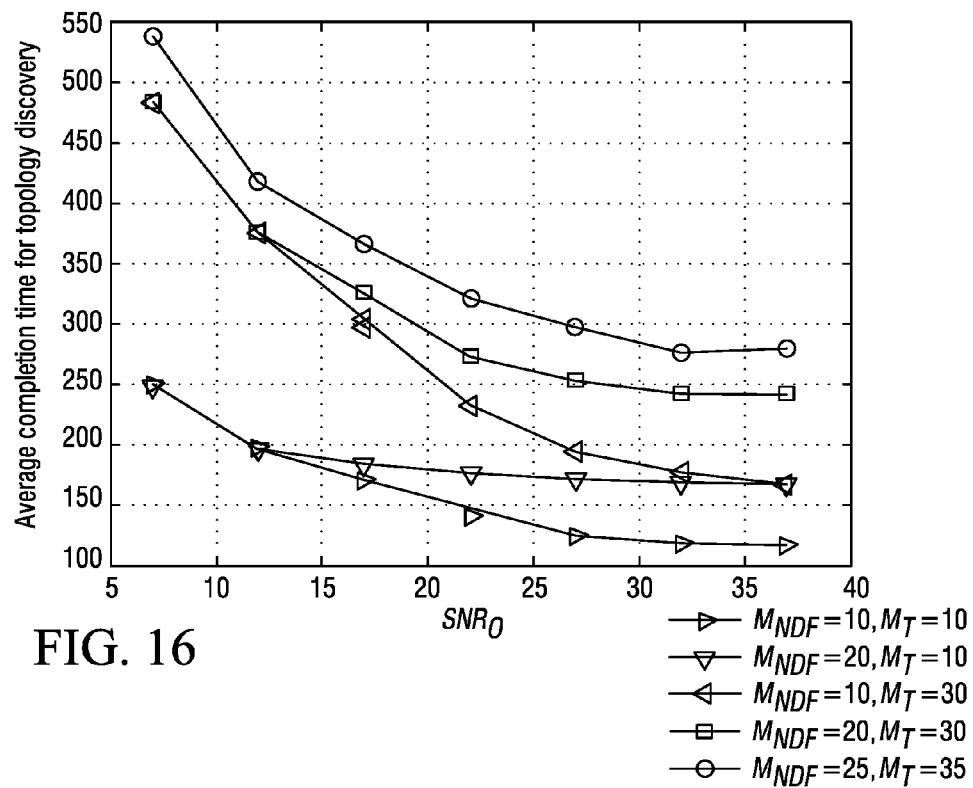
FIG. 16 shows the average time required to complete topology discovery versus the average one-hop SNR, parameterized by different values of $M_{NDF}$ and $M_T$.

The effects of two thresholds $M_{NDF}$ and $M_T$ on the performance of WTDP are now discussed. The value of threshold $M_H$ is set to 3 based on the discussion above. FIG. 15 plots the probabilities of correct topology discovery and in FIG. 16 shows the average time required to complete topology discovery versus the average one-hop SNR, parameterized by different values of $M_{NDF}$ and $M_T$. It can be seen that larger thresholds $M_{NDF}$ and $M_T$ result in an improved probability of correct topology discovery. This is because it is more unlikely that an incorrect identification of neighbor discovery failure occurs with a larger $M_{NDF}$ while a larger $M_T$ tends to improve the efficiency of the topology convergency check. On the flip side, FIG. 16 shows that larger values of $M_{NDF}$ and $M_T$ always lead to longer average time needed to complete the inauguration.

3. Neighbor Discovery Over Rician Fading Channels

Figure 17:
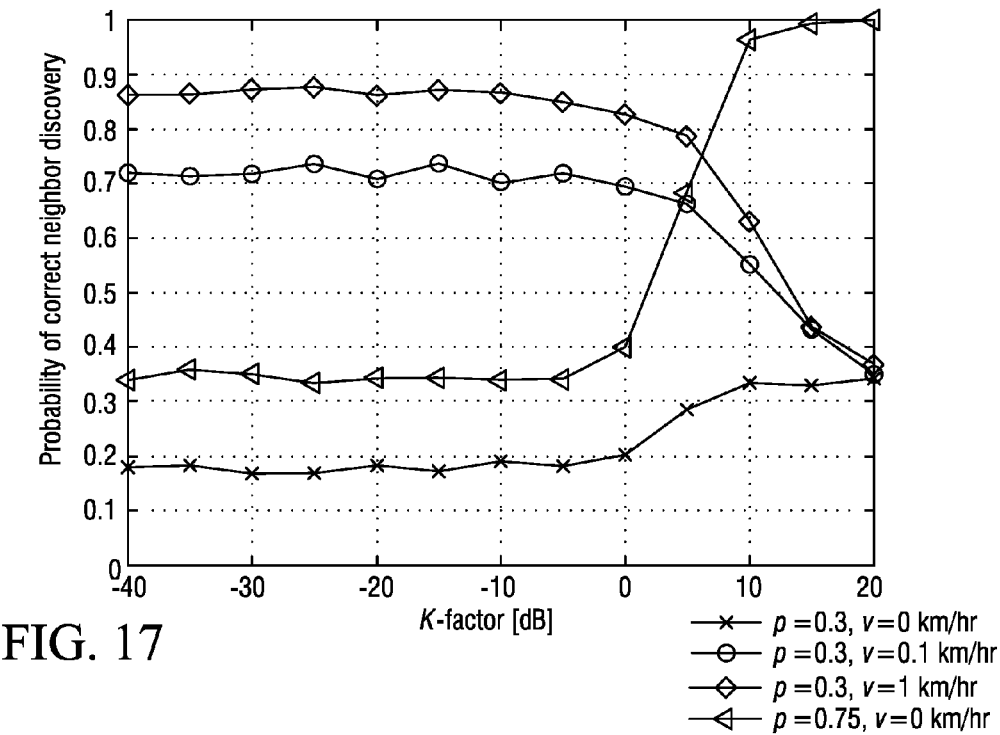
FIG. 17 shows the probability of correct neighbor discovery versus the Rician K-factor with different values of the transmission probability p and of the train speed v.

Neighbor discovery over flat-fading Rician channels is now considered. The defining parameter of Rician fading is the K-factor, which is defined as the power ratio of the line-of-sight component and diffuse components. FIG. 17 presents the probability of correct neighbor discovery versus the Rician K-factor with different values of the transmission probability p and of the train speed v. The standard Jakes model [39] is adopted to account for channel correlation as a function of the train velocity v. The threshold for neighbor discovery is set to $M_H$=10 and equal probability for transmission of a hello and a topology frames is set. It can be seen from FIG. 17 that in the low-K regime, the success rate is low over static channels, i.e. v=0 km/hour, but a minor increase in the train speed, i.e., with v=1 km/hour, significantly improves the success rate. This is because with static channels, time diversity is lost, but due to the long duration of a time slot (T=100 ms), a speed as low as 1 km/hour results in uncorrelated channel gains across different time slots. This can be verified by the fact that the success rate with low K-factor at the speed of 1 km/hour (see FIG. 17) converges to the success rate of 86%, which is also the success rate for neighbor discovery with the threshold $M_H$=10 shown in FIG. 12. Instead, in high-K regime, a larger transmission probability p results in higher probability correct neighbor discovery in the static case. This is explained by the fact that in this regime, the channel gain tends to be dominant by the line-of-sight component, yielding successful frame transmissions from both neighboring BNs and non-neighboring BNs in absence of collision. A larger transmission probability results in more collisions, which in turn reduce the chance of successful frame decoding, more severely for frames sent by non-neighboring BNs than for the ones sent by neighboring BNs, since the latter BNs are received with sufficient power not to incur outage.

D. Neighbor Discovery of Two Parallel Trains

In this subsection, the neighbor discovery performance is evaluated with two trains located on parallel tracks as described in the former section. The BNs of both trains transmit by using the slotted ALOHA protocol. Note that while this assumes synchronization between the trains, it is expected that the effect of inter-train interference is qualitatively the same even under asynchronous MACs. The neighbor discovery performance for train 1 is evaluated with train 2 serving as interference. Each train is equipped with six BNs. The beam width θ is selected as θ=π/3. Rayleigh fading is assumed.

Figure 18:
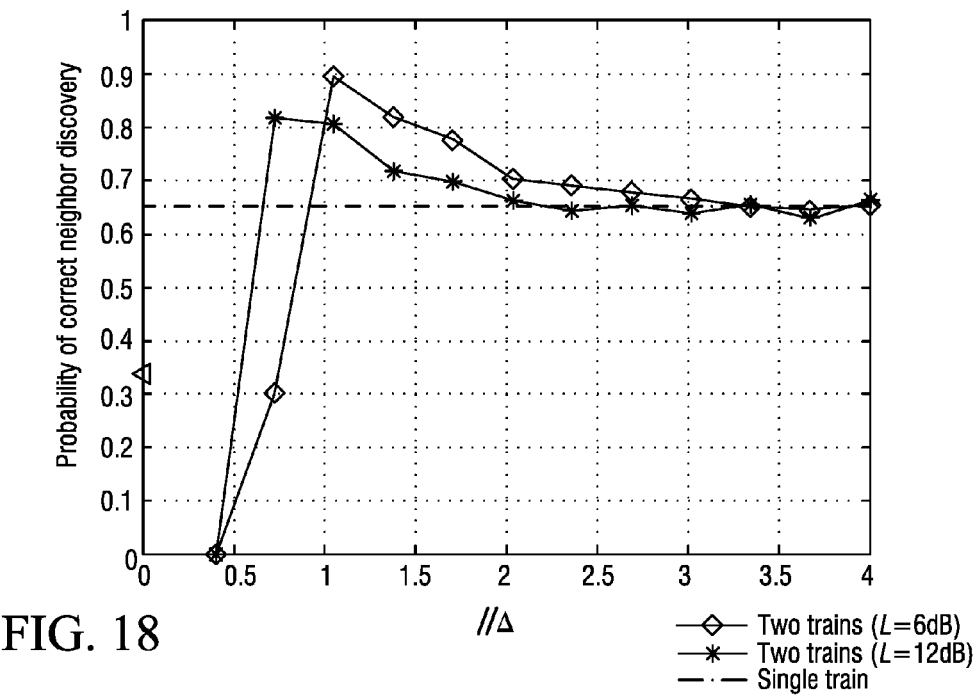
FIG. 18 shows the probability of correct neighbor discovery and the average time needed to complete neighbor discovery versus the ratio $1/\Delta$, parameterized by sidelobe attenuation L=6 dB and L=12 dB.
Figure 19:
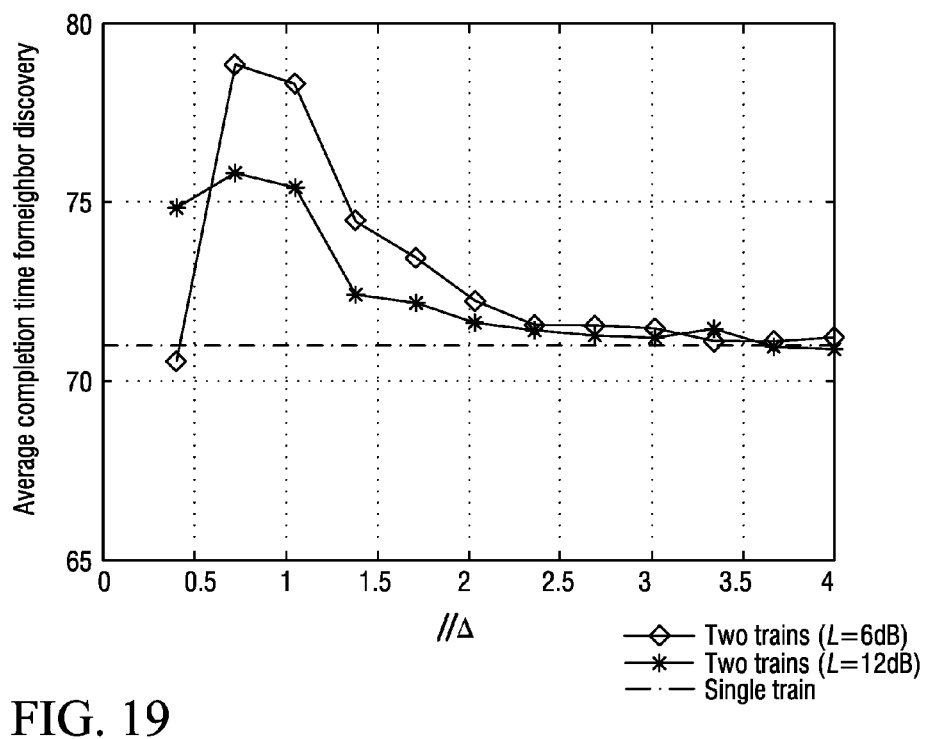
FIG. 19 shows the probability of correct neighbor discovery and the average time needed to complete neighbor discovery versus the ratio $1/\Delta$, parameterized by sidelobe attenuation L=6 dB and L=12 dB.

FIGS. 18 and 19 show the probability of correct neighbor discovery and the average time needed to complete neighbor discovery versus the ratio 1/Δ, parameterized by sidelobe attenuation L=6 dB and L=12 dB. Also shown for reference is the performance for the case in which only train 1 is present, i.e., no inter-train interference exists. It can be seen from FIG. 18 that the accuracy of neighbor discovery is poor for small 1/Δ, and that, as the ratio 1/Δ increases, the probability of successful neighbor discovery first increases and then decreases, reaching the interference-free performance for 1/Δ large enough. This can be explained as follows. With small 1/Δ, the BNs on train 2 tend to be selected by the neighbor discovery process run at BNs on train 1, causing the failure of neighbor discovery. This effect becomes less pronounced as the ratio 1/Δ increases and hence the performance is enhanced. Interestingly, for values of 1/Δ close to one, the interference may be even beneficial to neighbor discovery. The reason for this is similar to the one for the scenario in which concurrent transmission happens with a single train. It is also seen that a larger sidelobe attenuation causes this effect to be observed for lower values of 1/Δ. As 1/Δ increases further, the performance converges to that of a single train with no interference.

In contrast to the probability of correct neighbor discovery, the average time required to complete neighbor discovery is shown in FIG. 19 to be first degraded as 1/Δ increases before finally converging to the interference-free performance. This is because when l/Δ is close to one, frames from both trains tend to be received with similar powers leading to numerous outage events. Instead, if l/Δ is smaller, the BNs on train 1 will more likely choose BNs on train 2 as neighbors, while for larger l/Δ, neighbors tends to be successful.

It should be noted that the above embodiments are described only for better understanding, rather than restricting the present disclosure. Anyone skilled in the art can make any amendments to improvements on the implementing forms or details without departing from the scope of the present disclosure. The protection scope of the present disclosure shall still be determined by the claims.

The invention claimed is:

1. A method for wireless topology discovery for train backbone networks, comprising steps of:
   receiving, over a receiving channel by a backbone node in a train backbone network, data from a neighbor of the backbone node, through one directional antenna of at least one pair of directional antennas provided thereon,
   recording a receiving direction of said data, and determining said data to be a hello frame or a topology frame,
   performing neighbor discovery or topology discovery based on a type of said data,
   performing, in neighbor discovery phase, a pair consistency check on the data received by the backbone node along a same direction, so as to identify a neighbor of the backbone node, and simultaneously, stopping receiving hello frames along said direction,
   updating, in topology discovery phase, a local topology table of the backbone node based on received topology frames;
   performing a topology convergence check to determine whether any change occurs to the local topology table of the backbone node during a period of time, and reporting a status of the topology discovery phase to a high-level application if no change occurs; and
   wherein a frequency of the receiving channel is different from that of a transmission channel, and each antenna of the at least one pair of directional antennas has a different frequency band;
   wherein the backbone node performs the topology discovery in one direction of the train backbone network and the topology discovery in the other direction of the train backbone network.

2. The method for wireless topology discovery for train backbone networks according to claim 1, wherein in the neighbor discovery phase, a neighbor discovery counter is provided for counting hello frames received from another backbone node, and the another backbone node is identified as a neighbor of the backbone node if the neighbor discovery counter reaches or exceeds a first pre-defined threshold value.

3. The method for wireless topology discovery for train backbone networks according to claim 2, wherein after identifying the neighbor of the backbone node, receiving topology frames along said direction from the neighbor, and
   wherein if a destination address of received topology frames is an address of the backbone node, performing a pair consistency check on said currently received topology frames and previously saved topology frames so as to determine whether the backbone node and the neighbor are pairwise consistent or not, and in the meantime, stopping receiving any hello frames along said direction from the neighbor.

4. The method for wireless topology discovery for train backbone networks according to claim 2, wherein after identifying the neighbor of the backbone node, starting to receive topology frames along said direction from the neighbor, and
   wherein if a destination address of the received topology frames is not an address of the backbone node and the neighbor discovery counter exceeds a pre-defined threshold value, issuing a notice of a neighbor discovery failure.

5. The method for wireless topology discovery for train backbone networks according to claim 4, further including performing a topology convergency check on local topology frames received by the backbone node, and
   wherein if any change occurs to the local topology frames, the backbone node fails the topology convergency check, and then updates the local topology table based on changed topology frames and initializing a topology counter to zero; and if no change occurs to the local topology frames, the topology counter is increased by one, and if the topology counter reaches or exceeds a pre-defined threshold, the topology convergency check is passed and topology discovery at the backbone node is completed.

6. The method for wireless topology discovery for train backbone networks according to claim 1, wherein the topology frame contains a list of ordered MAC addresses in a current topology table of a sender backbone node.

7. The method for wireless topology discovery for train backbone networks according to claim 6, wherein a topology frame sent by a sender backbone node to a right neighbor contains all currently known MAC addresses of backbone nodes on the left of the sender backbone node in a discovered physical order, and a topology frame sent by the sender backbone node to a left neighbor contains all currently known MAC addresses of backbone nodes on the right of the sender backbone node in a discovered physical order.

8. A device for wireless topology discovery for train backbone networks, comprising:
   a receiver, for receiving topology frames and hello frames over a receiving channel frequency, by a backbone node in a train backbone network data from a neighbor backbone node of the backbone node, through one directional antenna of at least one pair of directional antennas provided thereon, each antenna in the pair having a different frequency band,
   a recorder, for recording a receiving direction of said data, and determining said data to be a hello frame or a topology frame,
   a neighbor discovery processor, for performing neighbor discovery or topology discovery based on a type of said data, and in neighbor discovery phase, performing a pair consistency checks on the data received by the backbone node along a same direction, so as to identify a neighbor of the backbone node, and simultaneously, stopping receiving hello frames along said direction by the backbone node,
   a topology store, for updating a local topology table of the backbone node based on received topology frames in topology discovery phase, and
   a topology generator, for performing a topology convergence check to determine whether any change occurs to the local topology table of the backbone node during a period of time, and, reporting a status of the topology discovery phase to a high-level application if no changes occur;

wherein the backbone node transmits over a transmission channel frequency that is different than the receiving channel frequency, and wherein the backbone node performs the topology discovery in one direction of the train backbone network and the topology discovery in the other direction of the train backbone network.

9. The device for wireless topology discovery for train backbone networks according to claim 8, wherein in the neighbor discovery phase, a neighbor discovery counter is provided for counting hello frames received from another backbone node, and the another backbone node is identified as a neighbor of the backbone node if the neighbor discovery counter reaches or exceeds a first pre-defined threshold value.

10. The device for wireless topology discovery for train backbone networks according to claim 9, wherein after identifying the neighbor of the backbone node, the backbone node starts to receive topology frames sent along said direction from the neighbor, and wherein if a destination address of the received topology frames is an address of the backbone node, performing a pair consistency check on said currently received topology frames and previously saved topology frames so as to determine whether the backbone node and the neighbor are pairwise consistent or not, and in the meantime, the backbone node stops receiving any hello frames along said direction from the neighbor.

11. The device for wireless topology discovery for train backbone networks according to claim 9, wherein after identifying the neighbor of the backbone node, the backbone node starts to receive topology frames along said direction from the neighbor, and wherein if a destination address of the received topology frames is not an address of the backbone node and the neighbor discovery counter exceeds a pre-defined threshold value, issuing a notice of a neighbor discovery failure.

12. The device for wireless topology discovery for train backbone networks according to claim 11, wherein a topology convergency check is performed on local topology frames received by the backbone node, and wherein if any change occurs to the local topology frames, it signals that the backbone node fails the topology convergency check, and then the local topology table is updated based on changed topology frames and a topology counter is initialized to zero; and if no change occurs to the local topology frames, the topology counter is increased by one, and if the topology counter reaches or exceeds a pre-defined threshold, it signals that the topology convergency check is passed and topology discovery at the backbone node is completed.

13. The device for wireless topology discovery for train backbone networks according to claim 8, wherein the topology frame contains a list of ordered MAC addresses in a current topology table of a sender backbone node.

14. The device for wireless topology discovery for train backbone networks according to claim 13, wherein a topology frame sent by a sender backbone node to a right neighbor contains all currently known MAC addresses of backbone nodes on the left of the sender backbone node in the discovered physical order, and a topology frame sent by the backbone node to a left neighbor contains all currently known MAC addresses of backbone nodes on the right of the sender backbone node in a discovered physical order.

15. On a car in an elongated serial succession of cars disposed along a linear or curved path, the car disposed between a first adjacently neighboring car on one side thereof along the path and a second adjacently neighboring car on another side thereof along the path, a network backbone node disposed on the car, the network backbone node comprising:

an RF transceiver configured to communicate point-to-point with a first neighboring backbone node on the first neighboring car using a first directional antenna operating on a first frequency band and aimed along the path in a first direction, and to communicate point-to-point with a second neighboring backbone node on the second neighboring car using a second directional antenna operating on a second frequency band different from the first frequency band and aimed along the path in a second direction different from the first direction;

a data discriminator connected to the RF transceiver, the data discriminator determining: (a) whether received data was received in the first direction or the second direction, and (b) whether said received data comprises a hello message or a topology message indicating network topology along the path beyond the car and the first and second adjacently neighboring cars; and a topology discovery processor coupled to the data discriminator, the topology discovery processor discovering network topology based on the received data, the topology discovery processor performing a pairwise consistency check on data received in a common direction to confirm the received data is from an adjacently neighboring car along the path, the topology discovery processor updating a stored network topology representation based on received topology messages, performing a topology convergence check to detect changes in the network topology representation over time, and reporting detected topology changes to an application, wherein the network backbone node performs the topology discovery in one direction of the train backbone network and the topology discovery in the other direction of the train backbone network.

* * * * *